US012650399B2

(12) United States Patent
Thomas et al.

(10) Patent No.: US 12,650,399 B2
(45) Date of Patent: Jun. 9, 2026

(54) PREPARATION AND ACTIVATION OF ELECTRODES BASED ON DLC AMORPHOUS CARBON BY ELECTROCHEMICAL TREATMENT

(71) Applicant: COMMISSARIAT A L'ENERGIE ATOMIQUE ET AUX ENERGIES ALTERNATIVES, Paris (FR)

(72) Inventors: Yohann Thomas, Grenoble cedex (FR); Fares Zouaoui, Grenoble cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 729 days.

(21) Appl. No.: 18/145,212

(22) Filed: Dec. 22, 2022

(65) Prior Publication Data

US 2023/0194459 A1 Jun. 22, 2023

(30) Foreign Application Priority Data

Dec. 22, 2021 (FR) ..................................... 21 14238

(51) Int. Cl.
*G01N 27/30* (2006.01)
*C25B 11/043* (2021.01)
(Continued)

(52) U.S. Cl.
CPC .......... *G01N 27/308* (2013.01); *C25B 11/043* (2021.01); *C25D 11/00* (2013.01); *G01N 27/38* (2013.01)

(58) Field of Classification Search
CPC ...... C25B 11/043; C25D 11/00; G01N 27/38; G01N 27/308
See application file for complete search history.

(56) References Cited

U.S. PATENT DOCUMENTS

| 6,607,642 B1 | 8/2003 | Kiesele et al. |
| 2010/0012494 A1 | 1/2010 | Kiesele et al. |
| 2013/0313120 A1 | 11/2013 | De Sanoit et al. |

FOREIGN PATENT DOCUMENTS

DE 199 39 011 C1 1/2001

OTHER PUBLICATIONS

French Preliminary Search Report issued Jul. 22, 2022 in French Application 21 14238, filed on Dec. 22, 2021 (with English Translation of Categories of cited documents), 3 pages.

(Continued)

*Primary Examiner* — Ciel P Contreras
(74) *Attorney, Agent, or Firm* — Oblon, McClelland, Maier & Neustadt, L.L.P.

(57) ABSTRACT

A process for activating the surface of an electrode based on DLC amorphous carbon by an electrochemical treatment including at least the following steps (i) and (ii), carried out in this order: (i) applying, to the electrode, an electrical excitation in the form of an alternation of cathodic and anodic electrical pulses, these being current or voltage pulses, in contact with an aqueous electrolyte including at least one oxidizing species of a redox pair having a standard potential, at ambient temperature and atmospheric pressure, denoted E0, strictly greater than 0, and at least one base salt; and (ii) applying, to the electrode that was previously subjected to step (i), an electrical excitation in the form of an alternation of cathodic and anodic electrical pulses, these being voltage pulses, in contact with an aqueous electrolyte devoid of electroactive species.

16 Claims, 11 Drawing Sheets

(51) Int. Cl.
*C25D 11/00* (2006.01)
*G01N 27/38* (2006.01)

(56) References Cited

OTHER PUBLICATIONS

Robertson, J. "Diamond-Like Amorphous Carbon" Materials Science and Engineering: R, 37 129-281 (Abstract Only) 3 pages.
Duran, B. et al. "Electrochemical activation of diamond microelectrodes: implications for the in vitro measurement of serotonin in the bowel" Royal Society of Chemistry. 2014. (7 pages).
Salazar-Banda, G. et al. "On the changing electrochemical behaviour of boron-doped diamond surfaces with time after cathodic pre-treatments" Electrochimica Acta 51 (2006) 4612-4619 (8 pages).
Nilkar, M. et al. "Effects of nitrogen incorporation on N-doped DLC thin film electrodes fabricated by dielectric barrier discharge plasma: Structural evolution and electrochemical performances" Journal of Alloys and Compounds (12 pages).

[Fig 1]
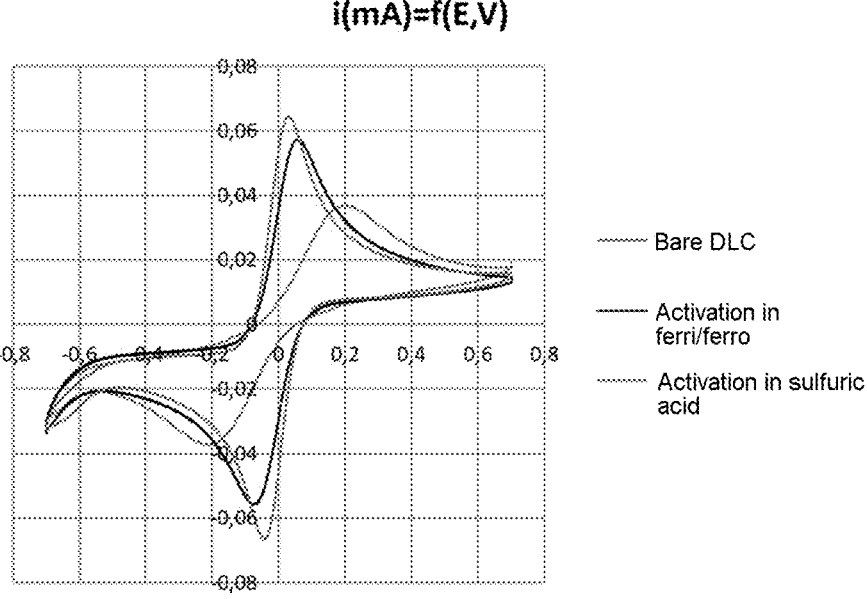
[Fig 2]
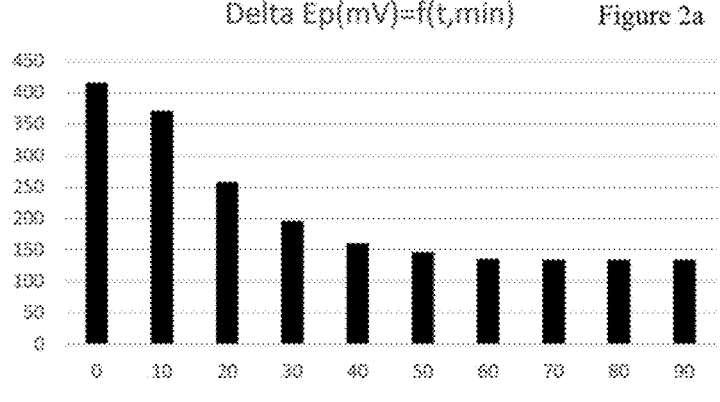
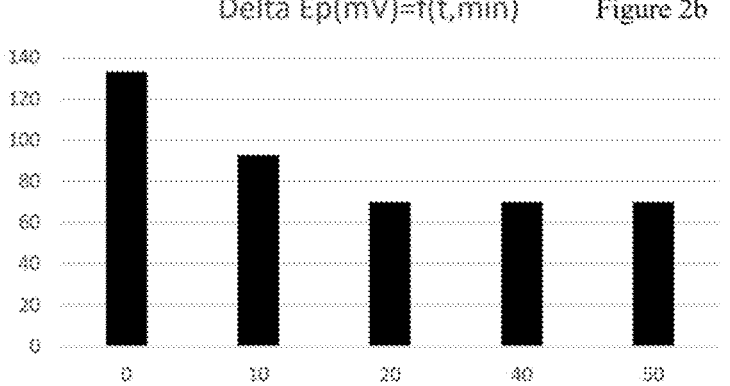

[Fig 3]
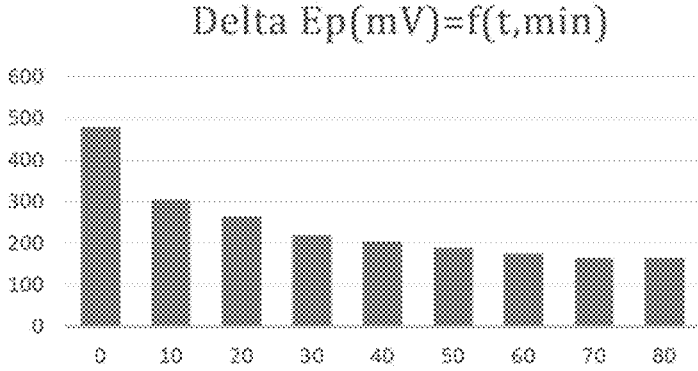
[Fig 4]
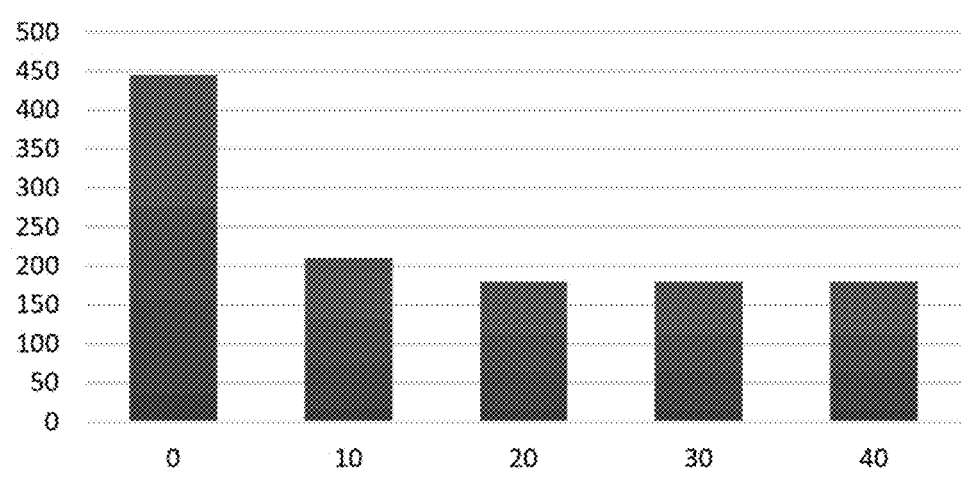
[Fig 5]
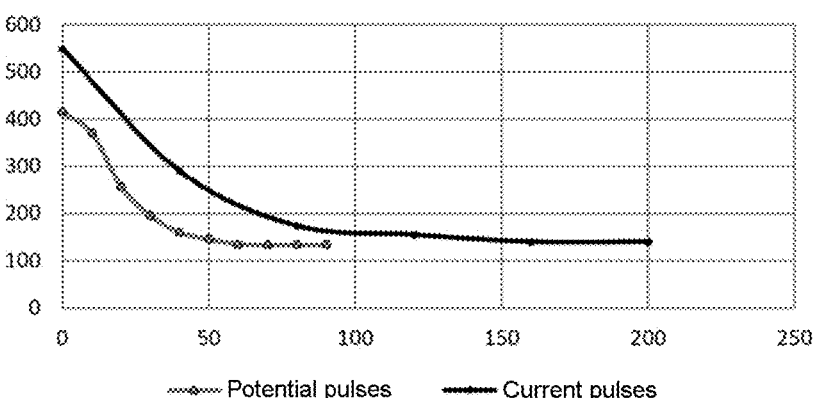

[Fig 6]
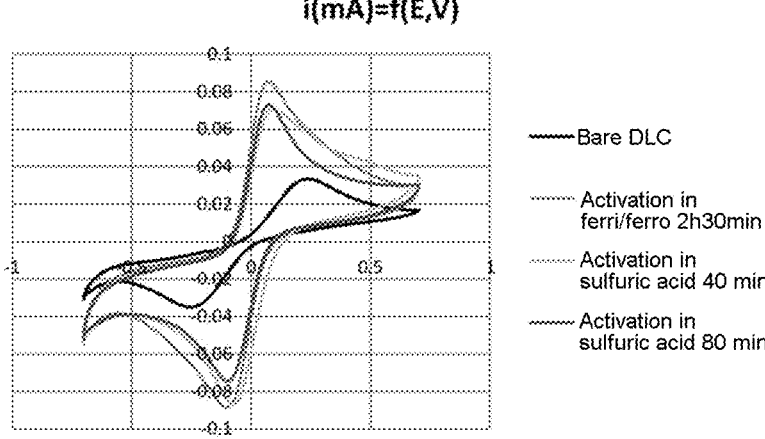
[Fig 7]
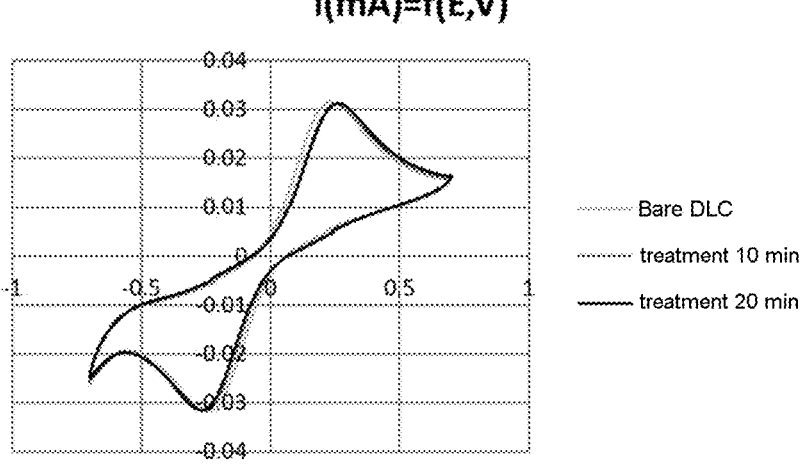
[Fig 8]
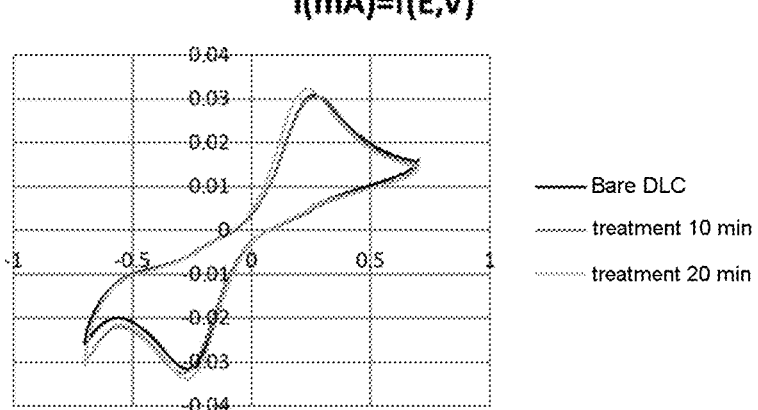

[Fig 9]
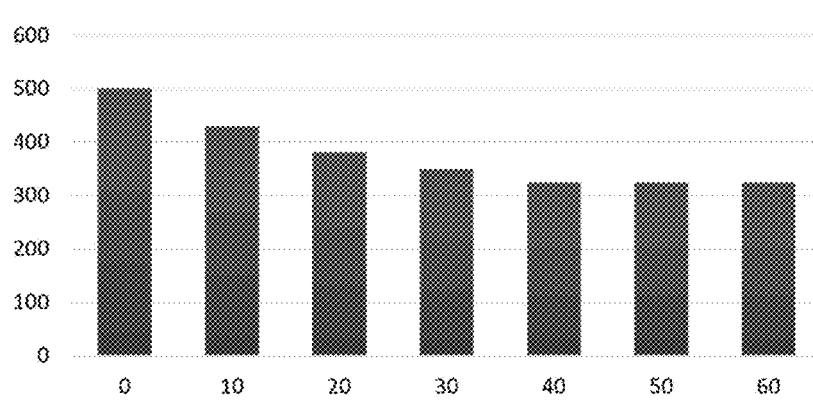
[Fig 10]
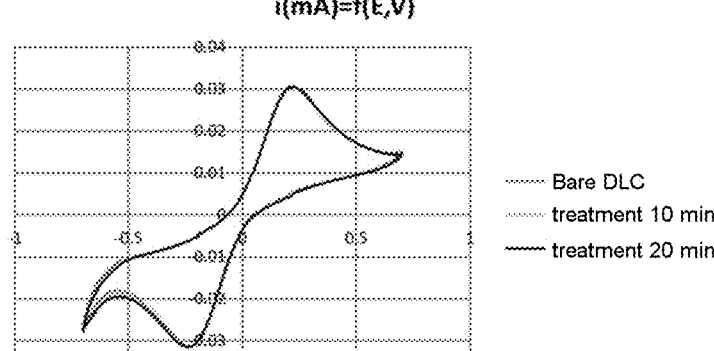
[Fig 11]
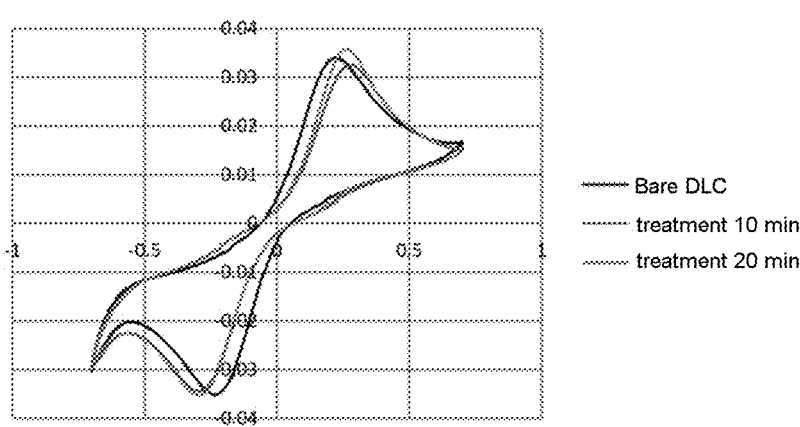

[Fig 12]
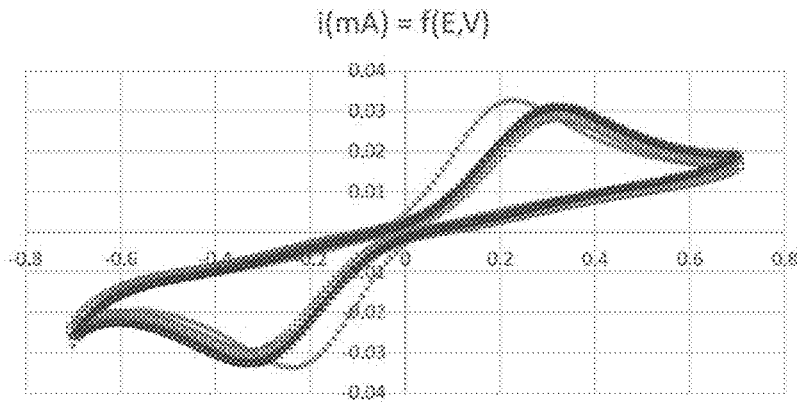
i(mA) = f(E,V)
› Bare DLC ○ treatment 10 min  × treatment 20 min  ▵ treatment 30 min
[Fig 13]
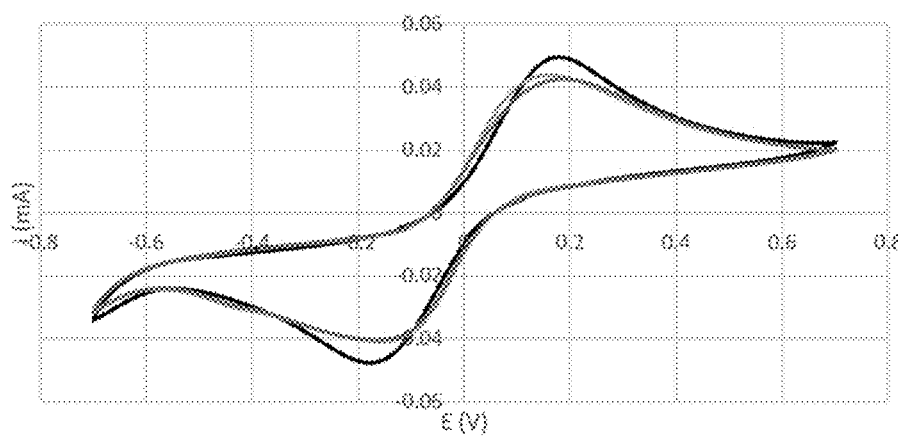
———— Bare DLC ········ treatment 10 min  ～～～ treatment 20 min

[Fig 14]
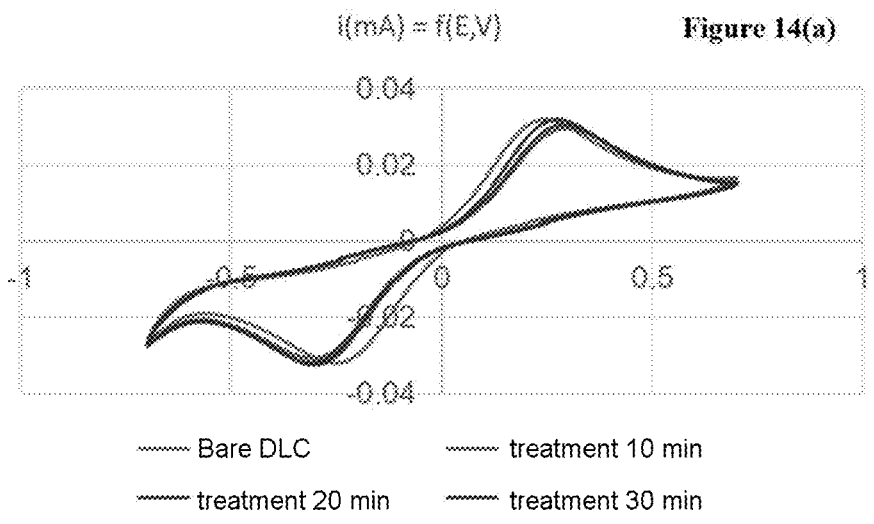
i(mA) = f(E,V)       Figure 14(a)
‑‑‑‑‑‑ Bare DLC       ‑‑‑‑‑‑ treatment 10 min
‑‑‑‑‑‑ treatment 20 min       ‑‑‑‑‑‑ treatment 30 min
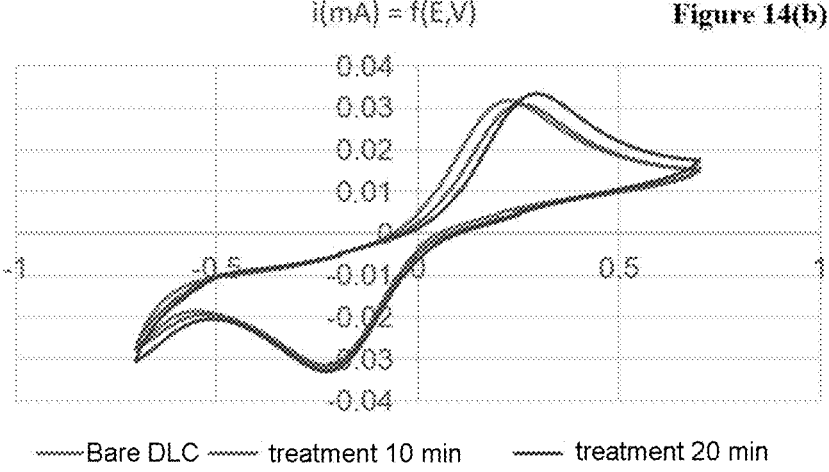
i(mA) = f(E,V)       Figure 14(b)
‑‑‑‑‑‑Bare DLC ‑‑‑‑‑‑ treatment 10 min       ‑‑‑‑‑‑ treatment 20 min

[Fig 15]
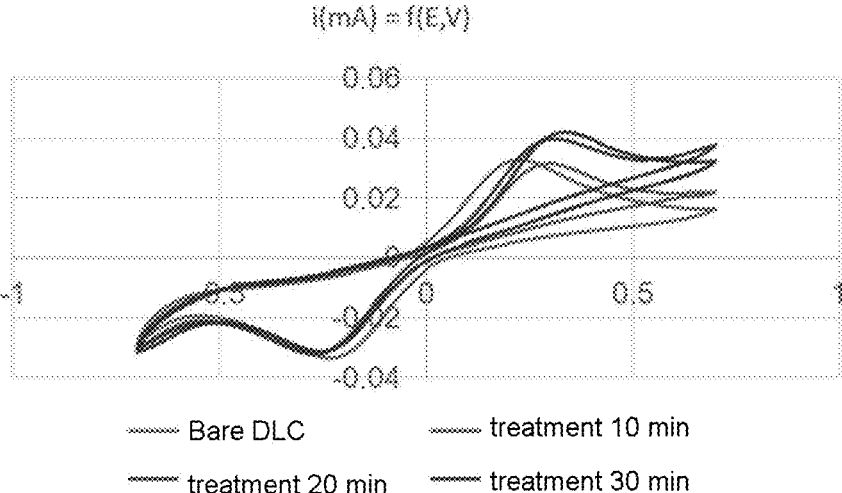
——— Bare DLC      ——— treatment 10 min
——— treatment 20 min      ——— treatment 30 min
[Fig 16]
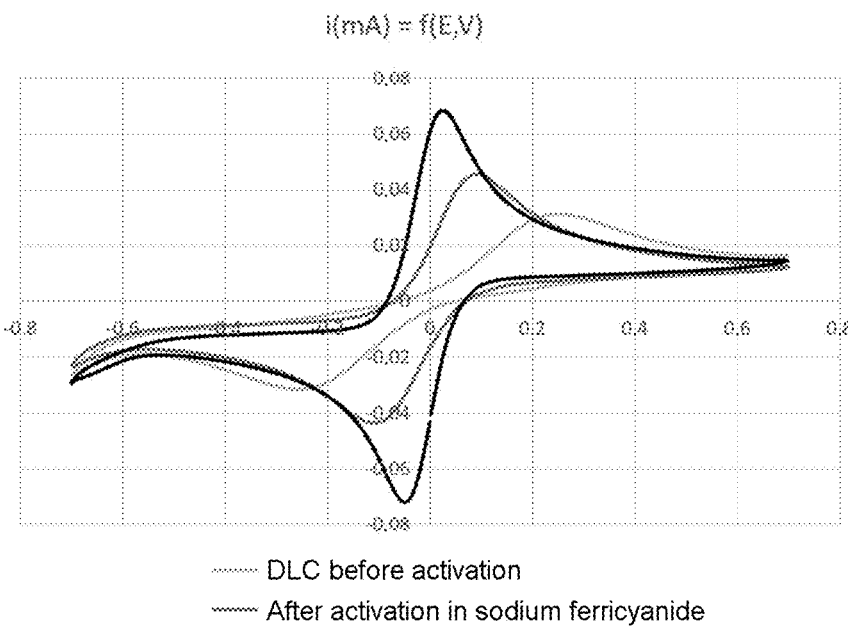
——— DLC before activation
——— After activation in sodium ferricyanide
——— After activation in Fe

[Fig 17]
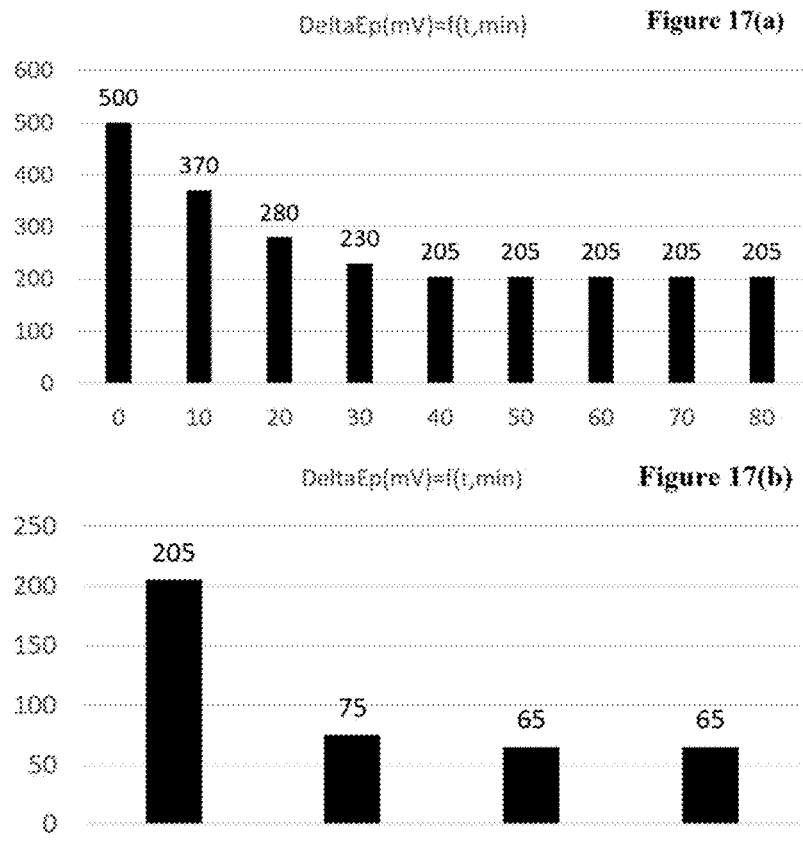
Figure 17(a)
Figure 17(b)
[Fig 18]
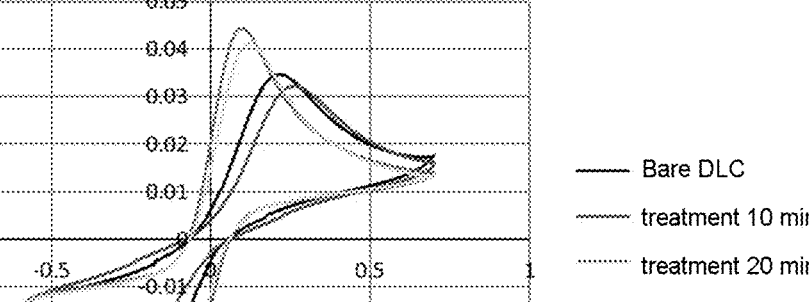
i(mA)=f(E,V)
Bare DLC
treatment 10 min
treatment 20 min
treatment 30 min

[Fig 19]
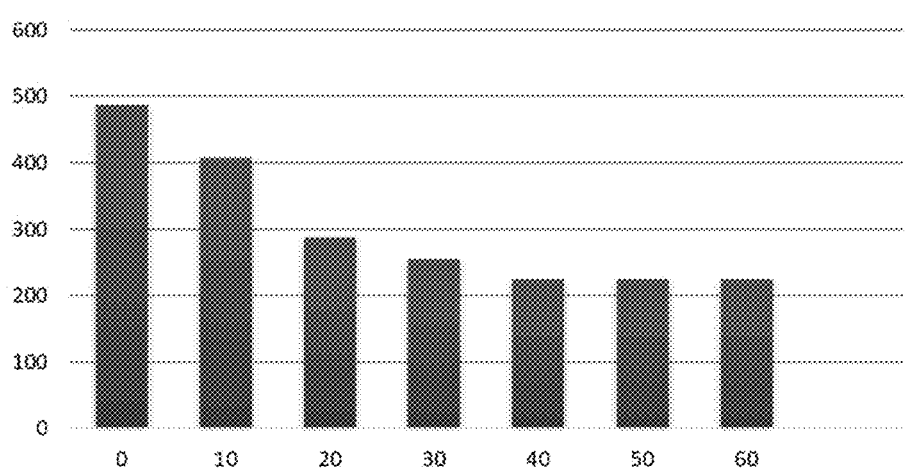
[Fig 20]
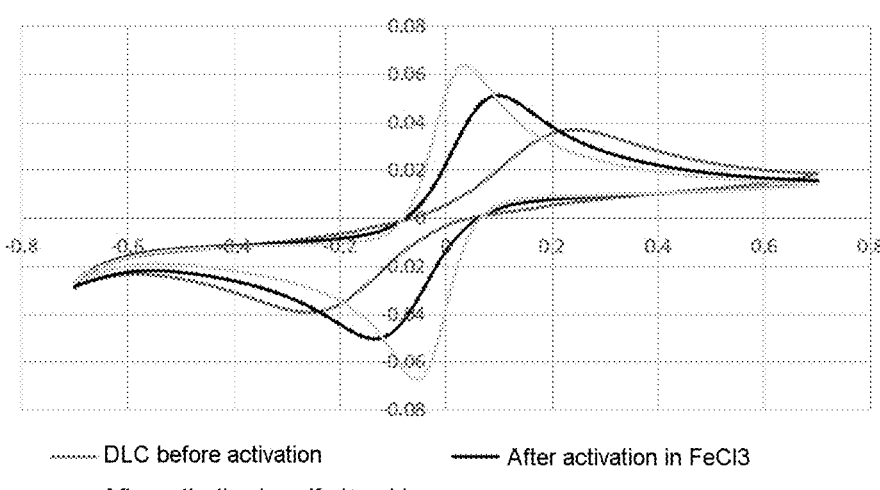

[Fig 21]
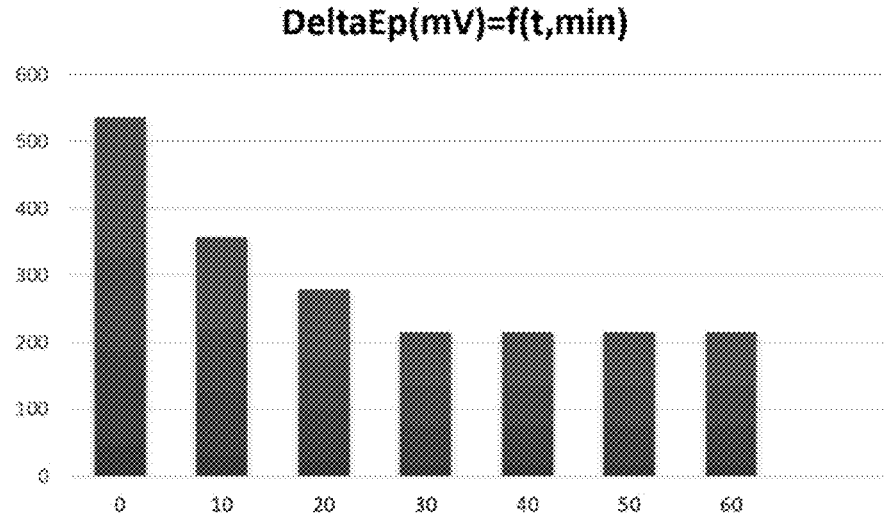
[Fig 22]
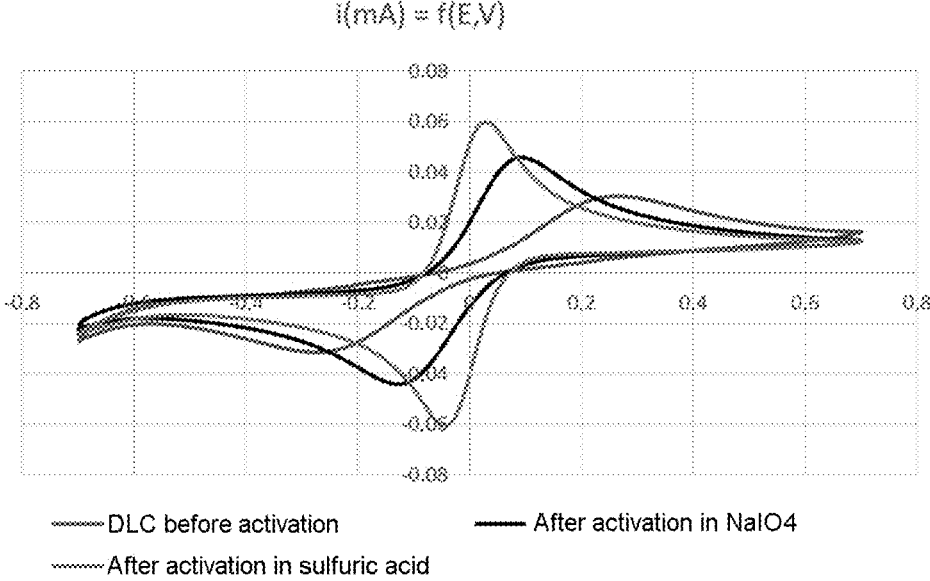

[Fig 23]
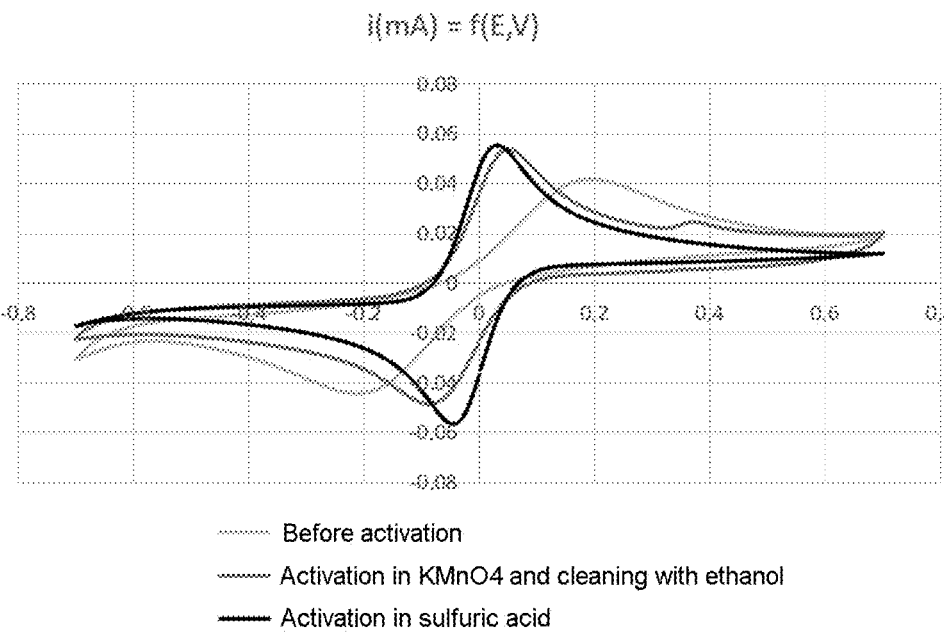
i(mA) = f(E,V)
··········· Before activation
---------- Activation in KMnO4 and cleaning with ethanol
▬▬▬▬ Activation in sulfuric acid

PREPARATION AND ACTIVATION OF ELECTRODES BASED ON DLC AMORPHOUS CARBON BY ELECTROCHEMICAL TREATMENT

TECHNICAL FIELD

The present invention relates to the field of the manufacture of electrochemical sensors for the physicochemical analysis of a liquid. More particularly, it relates to the preparation and the activation of DLC amorphous carbon electrodes by electrochemical treatment.

PRIOR ART

Electrodes based on doped diamond, in particular based on boron-doped diamond, more commonly denoted BDD, possess characteristics such as excellent chemical inertness, a low background current and a wide potential window, which make them particularly suitable for detection or analysis purposes. The preparation of these BDD electrodes exhibits production constraints (synthesis temperature >800° C., very precise settings); the cost of the synthesis (very slow crystal growth rate) is high. These disadvantages therefore restrict the use of BDDs to niche markets.

DLC (acronym for "diamond like carbon") amorphous carbon electrodes have been studied with the aim of replacing BDD electrodes. DLC, as described in publication [1], is characterized as a metastable form of amorphous carbon composed of C-sp2 and C-sp3 atomic bonds, with a significant proportion of sp3 bonds. DLC-based electrodes have numerous properties similar to BDD, including a high durability, an excellent wear resistance, chemical inertness, regeneration of the measurement interface, a low residual current, a wide potential window, and anticorrosion and biocompatibility properties.

In addition, advantageously, unlike BDD, the production of layers or films of DLC by vapour phase deposition (VPD) proves particularly advantageous and easy to implement. In particular, the DLC layers can be produced at ambient temperature, typically by magnetron cathode sputtering and in the absence of surface pretreatment. The DLC layers thus obtained have good properties of surface smoothing at the atomic level.

Thus, the DLC films can be easily prepared on various substrates, over large surface areas and in mass production. These qualities make DLC a particularly advantageous material compared to BDD for reducing the manufacturing cost of the electrodes. For example, DLC films may be microfabricated using conventional technology for preparing semiconductors and readily integrated into microfluidic channels for fabricating micro-biosensors.

Unfortunately, DLC has a low electrochemical reactivity compared to BDD, which does not allow the utilization of DLC films for the development of DLC-based electrodes suitable for detection and analysis purposes.

Consequently, there remains a need to be able to increase the surface electrochemical reactivity of DLC films in order to allow the use thereof as electrodes in electrochemical sensors. This is then referred to as a surface activation treatment.

Surface activation treatments have already been proposed with a view to improving the electrochemical properties of BDD-type electrodes.

For example, an electrochemical pretreatment of BDD microelectrodes has been studied by Duran et al. [2], with the aim of understanding how anodic, cathodic or combined polarization affects the charge transfer kinetics of the electrodes. The results show that better performance is obtained by applying a combined anodic and cathodic polarization. The pretreatments were carried out in 0.5 M $H_2SO_4$. The anodic pretreatment was carried out for 30 seconds at 250 $mA \cdot cm^{-2}$; and the cathodic pretreatment was carried out for 180 seconds at 250 $mA \cdot cm^{-2}$.

Likewise, Salazar-Banda et al. [3] subjected BDD electrodes to an anodic pretreatment by applying a voltage of 3 V vs SHE (standard hydrogen electrode) for 30 minutes, or else a cathodic treatment of −3 V vs SHE for between 3 and 30 minutes in 0.5 M $H_2SO_4$. The anodic pretreatment gives electrode surfaces which do not favour the electrochemical kinetics. However, cathodic pretreatment improves the electrochemical reactivity (maximum performance after 30 minutes) of the BDD and ensures reliable and reproducible results. Unfortunately, this treatment has the disadvantage of reducing the electrochemical window.

Mention may also be made of the document WO 2012/110600, which proposes a process for electrochemically activating an electrode based on doped diamond, in particular based on BDD, that makes it possible to obtain an electrode having satisfactory charge transfer kinetics and stable and reproducible electrochemical properties. The activation process consists in applying current or potential pulses. The absolute threshold values for the activation pulses in an electrolyte not containing electroactive species are −1 $\mu A \cdot cm^{-2}$ and 3 $mA \cdot cm^{-2}$ in current or −200 mV and 2 V in potential; whereas in an electrolyte containing electroactive species the values are −400 $\mu A \cdot cm^{-2}$ in current or −2 V in potential. An alternation of anodic pulses and cathodic pulses is recommended. It is also noted that it is not possible to carry out the activation in a medium comprising electroactive species by applying anodic current or potential pulses.

However, these methods, which are suitable for increasing the surface reactivity of electrodes based on doped diamond, prove inadequate for electrodes based on DLC amorphous carbon. The abovementioned treatments thus have little, or even no, effect on the electrochemical characteristics of DLC electrodes. What is more, these treatments lead to effects in terms of improvement in the electrochemical properties which are not reproducible, and result in DLC electrodes that are unstable over time.

There thus remains a need to have available a means for activating the surface of electrodes based on DLC amorphous carbon that makes it possible to improve the charge transfer kinetics and increase the active surface area of these electrodes, and also to obtain stable and homogeneous electrochemical properties.

SUMMARY OF THE INVENTION

The present invention is targeted precisely at proposing a treatment for activating the surface of electrodes based on DLC amorphous carbon that makes it possible to increase, homogenize and stabilize the electrochemical properties of the electrodes, in particular their electrochemical reactivity and their electrochemically active surface area.

More particularly, the invention relates, according to a first of its aspects, to a process for activating the surface of an electrode based on DLC amorphous carbon by an electrochemical treatment comprising at least the following steps (i) and (ii), carried out in this order:

(i) applying, to said electrode, an electrical excitation in the form of an alternation of cathodic and anodic electrical pulses, these being current or voltage pulses, in contact with an aqueous electrolyte comprising at least one oxidizing species of a redox pair having a standard potential, at ambient temperature and atmospheric pressure, denoted $E^0$, strictly greater than 0, and at least one base salt; and (ii) applying, to said electrode that was previously subjected to step (i), an electrical excitation in the form of an alternation of cathodic and anodic electrical pulses, these being voltage pulses, in contact with an aqueous electrolyte devoid of electroactive species.

As illustrated in the examples that follow, the inventors have found that it is possible to activate the surface of an electrode based on DLC amorphous carbon, referred to more simply in the remainder of the text as "DLC electrode", by implementing, in this order, the two steps (i) and (ii) of electrochemical surface treatment under the specific conditions mentioned above, in particular performed in two different electrolytes.

Advantageously, the surface activation process according to the invention, following the two electrochemical treatment steps mentioned above, makes it possible to obtain a DLC electrode having excellent electrochemical reactivity.

The electrochemical reactivity of an electrode can be evaluated by cyclic voltammetry (CV) in the presence of a reversible redox pair, for example in the presence of an equimolar mixture of potassium ferricyanide and potassium ferrocyanide, in particular under the conditions described in the examples that follow. The electrochemical reactivity is considered to be all the better the smaller the difference, denoted $(\Delta E_p)$, between the potential of the anodic peak (denoted $E_a$) and that of the cathodic peak (denoted $E_c$).

The activation process according to the invention advantageously makes it possible to significantly increase the electrochemical reactivity of the electrode, in other words to significantly reduce the value of $\Delta E_p$ of the electrode, advantageously by at least 50% of its initial value before treatment, in particular by at least 60%, especially by at least 70%, or even by at least 80%, of its initial value before treatment.

Likewise, advantageously, the surface activation process according to the invention makes it possible to increase the number of active sites, in other words to increase the electrochemically active surface area of the DLC electrode.

The increase in the electrochemically active surface area of an electrode can be assessed by the increase in the intensity of the anodic current (denoted $i_a$) and/or cathodic current (denoted $i_c$) during a cyclic voltammetry test, as described above for the assessment of the surface electrochemical reactivity.

The double electrochemical treatment in accordance with the activation process according to the invention thus makes it possible to significantly improve the electrochemical properties of a DLC electrode, in particular to improve the electrochemical reactivity and the active surface area of the DLC electrode.

What is more, as illustrated in the examples that follow, the electrochemical activation process according to the invention makes it possible not only to improve the electrochemical performance qualities but also to homogenize these performance qualities. In particular, advantageously, irrespective of the values for electrochemical reactivity and active surface area of the electrodes before treatment, the activation treatment according to the invention makes it possible to result in electrodes having electrochemical properties, in particular an electrochemical reactivity and an active surface area, that are improved and similar.

Likewise, the electrochemical activation process according to the invention makes it possible to obtain stable and reproducible electrochemical properties.

In particular, advantageously, the DLC electrodes activated according to the process of the invention have a good oxidation stability, for example when they are exposed to the open air for several days.

The invention also relates, according to another of its aspects, to an electrode based on DLC amorphous carbon, the surface of which is electrochemically activated by a process according to the invention, as defined above.

Advantageously, the electrochemical activation process according to the invention can be used to treat large-surface-area DLC electrodes.

Thus, according to one particularly advantageous embodiment variant, the electrochemical activation process according to the invention may be applied to a whole wafer, in particular a silicon or metallic wafer or a wafer of polymeric nature, coated with a DLC layer and intended to form, after cutting, individual electrodes with dimensions suitable for their application. Such an embodiment variant is particularly advantageous in terms of production cost and of reproducibility of the electrochemical properties from one individual electrode to another.

Alternatively, the electrochemical activation process according to the invention may be applied to an electrode, referred to as individual electrode, already having dimensions suitable for its application, it being possible for said individual electrode to be obtained beforehand for example on conclusion of cutting of a wafer with large dimensions, for example a silicon wafer, coated with a DLC layer.

The activated DLC-based electrodes obtained on conclusion of the process of the invention, having excellent electrochemical properties, in particular in terms of high electrochemical reactivity and active surface area, and of stability, may advantageously be used for the manufacture of electrochemical sensors, in particular intended for the physicochemical analysis of liquids of various natures. They may also be used as electrodes in detectors used in biotechnology, for example for monitoring bio-production processes.

The invention thus relates, according to another of its aspects, to the use of an electrode based on DLC amorphous carbon according to the invention, the surface of which is electrochemically activated by a process according to the invention, in an electrochemical sensor, in particular intended for the physicochemical analysis of a liquid, for example for monitoring the quality of water, or in a biotechnological detector.

The invention also relates to an electrochemical sensor, in particular intended for the physicochemical analysis of a liquid, for example for monitoring the quality of water, comprising an electrode based on DLC amorphous carbon the surface of which is electrochemically activated by a process according to the invention.

Other features, variants and advantages of the surface activation process according to the invention, and of the activated electrodes based on DLC amorphous carbon thus obtained, will emerge more clearly on reading the description, the examples and figures which follow, which are given by way of illustration and do not limit the invention.

In the continuation of the text, the expressions "between . . . and . . . ", "ranging from . . . to . . . " and "varying from . . . to . . . " are equivalent and are intended to mean that the limits are included, unless mentioned otherwise.

BRIEF DESCRIPTION OF THE DRAWINGS

FIG. 1 presents the voltammograms produced for a DLC electrode before activation, after the first step of the activation treatment and after the second step of the activation treatment according to the invention, under the conditions described in Example 1.1.;

FIG. 2 presents the results, in accordance with Example 1.2., for the electrochemical reactivity of a DLC electrode ($\Delta E_p$) obtained on conclusion of the first step of the activation treatment (FIG. 2(*a*)), for different excitation durations (from 0 to 90 minutes), and on conclusion of the second step of the activation treatment (FIG. 2(*b*)), for different excitation durations (from 0 to 50 minutes);

FIG. 3 presents the results for the electrochemical reactivity of a DLC electrode ($\Delta E_p$) on conclusion of the first step of the activation treatment under the conditions described in Example 2, for different excitation durations (from 0 to 80 minutes);

FIG. 4 presents the results, in accordance with Example 3, for the electrochemical reactivity of a DLC electrode ($\Delta E_p$) on conclusion of the first step of the activation treatment for different electrical excitation durations (from 0 to 40 minutes);

FIG. 5 presents the variation in $\Delta E_p$ on conclusion of the first step of the activation treatment, carried out with potential pulses (Example 1) or current pulses, as a function of the excitation duration, under the conditions described in Example 4;

FIG. 6 presents the voltammograms, produced under the conditions described in Example 5, for a DLC electrode before activation, on conclusion of the first step of the electrochemical treatment carried out in accordance with the conditions of Example 4, and on conclusion of a second step of electrochemical treatment carried out with current pulses;

FIG. 7 presents the voltammograms produced for a DLC electrode, under the conditions of Example 6, before activation, and after 10 minutes and 20 minutes of a step of electrochemical treatment by excitation with solely cathodic pulses;

FIG. 8 presents the voltammograms produced for a DLC electrode, under the conditions of Example 7, before activation, and after 10 minutes and 20 minutes of a step of electrochemical treatment by excitation with solely anodic pulses;

FIG. 9 presents the results for the electrochemical reactivity of a DLC electrode ($\Delta E_p$) on conclusion of the electrochemical treatment carried out under the conditions described in Example 8, in an electrolyte devoid of oxidizing species for different durations of electrical excitation;

FIG. 10 presents the voltammograms produced for a DLC electrode in accordance with the conditions of Example 9, before treatment and after 10 minutes and 20 minutes of an electrochemical treatment in an electrolyte comprising Mohr's salt;

FIG. 11 presents the voltammograms produced for a DLC electrode in accordance with the conditions of Example 10, before treatment and after 10 minutes and 20 minutes of an electrochemical treatment in an electrolyte comprising cobaltocene;

FIG. 12 presents the voltammograms produced for a DLC electrode in accordance with the conditions of Example 11, before treatment and after 10 minutes, 20 and 30 minutes of an electrochemical treatment in an electrolyte comprising sodium cyanide;

FIG. 13 presents the voltammograms produced for a DLC electrode in accordance with the conditions of Example 12, before treatment and after 10 minutes and 20 minutes of an electrochemical treatment in an electrolyte comprising ferrocenemethanol;

FIG. 14 presents the voltammograms produced for a DLC electrode in accordance with the conditions of Example 13, before treatment and after 10 minutes, 20 minutes and 30 minutes of an electrochemical treatment in an electrolyte comprising 1 mM (FIG. 14(*a*)) and 2 mM (FIG. 14(*b*)) sodium ferrocyanide;

FIG. 15 presents the voltammograms produced for a DLC electrode in accordance with the conditions of Example 14, before treatment and after 10 minutes, 20 minutes and 30 minutes of an electrochemical treatment in an electrolyte comprising 1 mM potassium ferrocyanide;

FIG. 16 presents the voltammograms produced for a DLC electrode before activation, after the first step of the activation treatment and after the second step of the activation treatment according to the invention, under the conditions described in Example 15;

FIG. 17 presents the results, in accordance with Example 15, for the electrochemical reactivity of a DLC electrode ($\Delta E_p$) obtained on conclusion of the first step of the activation treatment (FIG. 17(*a*)), for different excitation durations (from 0 to 80 minutes), and on conclusion of the second step of the activation treatment (FIG. 17(*b*)), for different excitation durations (from 0 to 30 minutes);

FIG. 18 presents the voltammograms produced for a DLC electrode in accordance with the conditions of Example 16, before treatment, and after 10 minutes, 20 minutes and 30 minutes of the second step of the activation treatment, without a previous first step;

FIG. 19 presents the results, in accordance with Example 17, for the electrochemical reactivity of a DLC electrode ($\Delta E_p$) on conclusion of the first step of the activation treatment for different electrical excitation durations (from 0 to 60 minutes);

FIG. 20 presents the voltammograms produced for a DLC electrode before activation, after the first step of the activation treatment and after the second step of the activation treatment according to the invention, under the conditions described in Example 17;

FIG. 21 presents the results, in accordance with Example 18, for the electrochemical reactivity of a DLC electrode ($\Delta E_p$) on conclusion of the first step of the activation treatment for different electrical excitation durations (from 0 to 60 minutes);

FIG. 22 presents the voltammograms produced for a DLC electrode before activation, after the first step of the activation treatment and after the second step of the activation treatment according to the invention, under the conditions described in Example 19;

FIG. 23 presents the voltammograms produced for a DLC electrode before activation, after the first step of the activation treatment and after the second step of the activation treatment according to the invention, under the conditions described in Example 20.

DETAILED DESCRIPTION

Electrode Based on DLC Amorphous Carbon

As indicated above, the process of the invention has the aim of activating the surface of an electrode based on "DLC" (acronym for "diamond like carbon") amorphous carbon.

In the context of the invention, the term "DLC-based electrode" is understood to mean any electrode of which the constituent or one of the constituents is DLC. A DLC-based electrode may thus be an electrode consisting solely of DLC or else an electrode in which DLC represents just part of the electrode.

In particular, a DLC-based electrode may comprise, or even be formed of, a DLC layer (or film) supported by a substrate, in particular made of metal, metalloid or polymeric material(s), for example made of silicon.

The substrate, which is in particular made of silicon, may have a thickness of between 0.1 and 2 mm, in particular between 0.5 and 1 mm and more particularly between 0.7 and 0.9 mm.

The DLC layer preferably has a thickness of between 10 nm and 10 μm, in particular between 20 nm and 500 nm and more particularly between 25 nm and 250 nm.

As mentioned above, DLC is well known; it is for example described in publication [1]. DLC is characterized as a metastable form of amorphous carbon with a significant proportion of sp3 bonds.

The DLC electrode may be prepared beforehand by any technique known to those skilled in the art.

Preferably, the preparation of a DLC electrode employs at least one step of depositing a DLC layer on the surface of said substrate, which is in particular made of silicon.

Said substrate, which is especially made of silicon, and intended to support the DLC layer, may be subjected prior to the deposition of said DLC layer to a surface treatment of chemical deoxidation, preferably on both of its faces, which advantageously makes it possible to increase the transverse electrical conductivity.

Said electrode based on DLC amorphous carbon may be prepared by deposition of DLC, on the surface of the substrate, by any technique known to those skilled in the art, for example by magnetron cathode sputtering deposition.

It is up to those skilled in the art to adjust the conditions of the DLC deposition by magnetron cathode sputtering in order to obtain the desired DLC layer.

Advantageously, the DLC layer can be produced at ambient temperature (25±5° C.).

Advantageously, the DLC-based electrode is not subjected to any surface pretreatment or polishing of the DLC layer prior to its activation by the process of the invention.

As mentioned above, the DLC layer can be easily formed on a surface with large dimensions. Thus, according to a first embodiment variant, the DLC-based electrode used in a surface activation process according to the invention may be a substrate, also referred to as wafer, coated on at least one of its two faces with a DLC layer and intended to form, after cutting, individual electrodes with dimensions suitable for the desired use.

Said wafer can typically have varied shapes (circular, square, rectangular) with surface areas of between 0.1 and 2000 cm$^2$, in particular between 1 and 400 cm$^2$.

The electrochemical treatment process according to the invention can also be used to activate the surface of an individual DLC-based electrode already having the dimensions desired for its intended use.

The individual DLC-based electrode may for example have been obtained beforehand by cutting a silicon wafer coated with a DLC layer, for example as described above.

The DLC-based electrode may for example have surface areas of between 0.1 and 100 mm$^2$, in particular between 1 and 50 mm$^2$.

Electrochemical Activation Treatment

As indicated above, the surface activation treatment according to the invention proceeds in two steps, carried out in this order and under the specific conditions indicated above and detailed in the remainder of the text, of electrical excitation in the form of alternating pulses. Unless indicated otherwise, the features described below, relating to an excitation in the form of alternating electrical pulses, apply to the first step, denoted step (i), and/or to the second step, denoted step (ii), of the electrochemical activation treatment according to the invention.

A pulse denotes a short-duration variation in a physical magnitude (voltage, current, etc.) with a return to the initial state.

Within the context of the invention, "electrical pulse", also referred to more simply as "pulse", is understood to mean a short-duration variation in voltage (potential) or in current, followed by a return to the initial state (generally to an amplitude equal to zero) of the value of the voltage or of the current.

The duration of the electrical pulses of step (i) and/or of step (ii) of electrical excitation according to the invention, denoted $t_i$, may more particularly be between 5 ms and 500 ms, in particular between 10 ms and 250 ms and more particularly between 20 ms and 250 ms, and may preferably be 100 ms.

Within the context of the invention, the term "amplitude" is understood to mean the maximum value of the anodic or cathodic voltage (respectively, current) reached during an anodic or cathodic voltage (respectively, current) pulse relative to a baseline, generally equal to zero.

In general, the amplitude, in absolute value, of an electrical voltage pulse carried out in accordance with step (i) and/or step (ii) of the activation process according to the invention may be greater than or equal to 0.5 V, in particular between 0.5 and 1.5 V and more particularly between 0.8 and 1.3 V.

In general, the amplitude, in absolute value, of an electrical current pulse carried out in accordance with step (i) of the activation process according to the invention may be greater than or equal to 0.1 $\mu$A·cm$^{-2}$, in particular between 0.1 and 100 $\mu$A·cm$^{-2}$ and more particularly between 0.5 and 25 $\mu$A·cm$^2$.

As indicated above, each of the two steps of the electrochemical activation treatment according to the invention is carried out in the form of alternating electrical pulses.

The term "alternating electrical pulses" is understood to mean that the electrical excitation is carried out by alternating between one or more cathodic pulses and one or more anodic pulses, in other words following a sequence of cathodic pulse(s)-anodic pulse(s), etc.

The number of cathodic (respectively, anodic) pulse(s) carried out in succession may be the same or different from one sequence to another. It may more particularly be between 1 and 30 pulses, preferably between 1 and 20 pulses, in particular between 1 and 10 pulses, especially between 1 and 5 pulses and preferably between 1 and 3 pulses.

An anodic pulse (also referred to as positive pulse) may be considered as being a wave of positive amplitude the amplitude of which rises with respect to the baseline and, after a duration $t_i$, returns to the baseline. A cathodic pulse (also referred to as negative pulse) may be considered as being a wave of negative amplitude, in other words a wave the amplitude of which falls with respect to the baseline and returns to the baseline after a duration $t_i$.

Preferably, the electrical excitation in accordance with step (i) and/or step (ii) of the activation process according to the invention is carried out in the form of periodic pulses. In other words, the excitation in accordance with step (i) and/or step (ii) is formed by the repetition of a sequence formed of a fixed number, denoted ne, of cathodic pulse(s) and a fixed number, denoted $n_a$, of anodic pulse(s).

As indicated above, the number ne of cathodic pulses may vary between 1 and 30 pulses, preferably between 1 and 20 pulses, in particular between 1 and 10 pulses, especially between 1 and 5 pulses and preferably between 1 and 3 pulses.

The number $n_a$ of anodic pulses may vary between 1 and 30 pulses, preferably between 1 and 20 pulses, in particular between 1 and 10 pulses, especially between 1 and 5 pulses and preferably between 1 and 3 pulses.

Preferably, the electrical excitation in accordance with step (i) and/or step (ii) is carried out in the form of an alternation of a single cathodic pulse and a single anodic pulse (in other words, $n_c=1$ and $n_a=1$).

An electrical pulse may have any possible form, for example square, triangular, sinusoidal, sawtooth, staircase, etc., or a mixture of these forms. Preferably, the pulses produced for the electrical excitation have the same form, in particular a square wave form.

The cathodic (respectively, anodic) pulses of a given step of electrical excitation according to the activation process of the invention may be identical or non-identical. In particular, a cathodic (respectively, anodic) pulse may differ from another cathodic (respectively, anodic) pulse with regard to the duration thereof, the amplitude thereof and/or the form thereof.

In particular, the amplitude, in absolute value, of the pulses may vary from one cathodic pulse to another, from one anodic pulse to another, and/or between one cathodic pulse and one anodic pulse.

Preferably, all of the cathodic (respectively, anodic) pulses, produced for carrying out a step of electrical excitation according to the activation process of the invention, are identical, in other words have the same duration, the same amplitude and the same form.

More preferentially still, all of the cathodic and anodic pulses for carrying out a given step of electrical excitation in accordance with the activation process according to the invention are identical, in other words have the same duration, the same amplitude in absolute value and the same form.

(i) First Activation Step

As indicated above, the first step of the electrochemical activation treatment according to the invention is carried out in an aqueous electrolyte comprising at least one specific oxidizing species and at least one base salt.

Preferably, the aqueous medium of the electrolyte in contact with which the first step of the activation treatment is carried out is formed by water.

Preferentially, the electrolyte for the first step of the activation treatment comprises, or even is formed of, one or more oxidizing species and one or more base salts, in water.

As stated above, said oxidizing species of the electrolyte for implementing the first activation step according to the invention belongs to a redox pair having a standard potential, at ambient temperature (25° C.) and atmospheric pressure, denoted $E^0$, strictly greater than 0.

Preferably, the oxidizing species of the electrolyte in contact with which the first activation step according to the invention is carried out belongs to a redox pair having a standard potential $E^0$ of greater than or equal to 0.05 V, especially greater than or equal to 0.08 V, in particular greater than or equal to 0.1 V and more particularly greater than or equal to 0.2 V.

For example, said oxidizing species belongs to a redox pair having a standard potential $E^0$ of between 0.05 V and 3 V, in particular between 0.1 V and 2.5 V, especially between 0.2 V and 2 V.

The standard potentials $E^0$ of redox pairs are generally listed in the literature, for example in *RC Handbook of Chemistry and Physics, David R. Lide,* 88*th edition* (2007-2008).

Advantageously, said oxidizing species used in the electrolyte for the first activation step according to the invention is/are soluble in the aqueous medium of the electrolyte, in particular in the water.

The oxidizing species may be organic or inorganic.

In particular, the oxidizing species may be metallic, for example based on iron(III) (iron in the +3 oxidation state), or nonmetallic.

More particularly, the oxidizing species based on iron(III) may be chosen from ferricyanide (also known as hexacyanoferrate(III), of the formula $Fe(CN)_6^{3-}$) or the iron(III) ion.

The oxidizing species based on iron(III) may for example be used in the electrolyte in the form:

of a ferricyanide salt, in particular of alkali metal or alkaline earth metal ferricyanide type, especially an alkali metal ferricyanide, such as potassium ferricyanide, sodium ferricyanide, lithium ferricyanide, or one of the mixtures thereof; or of an iron(III) ion salt, for example iron(III) chloride (also known as ferric chloride, of the formula $FeCl_3$).

The ferricyanide salt, for example the potassium ferricyanide, may be used in the electrolyte, alone or in the form of a mixture of ferrocyanide and ferricyanide ($Fe(CN)_6^{3-}/Fe(CN)_6^{4-}$), for example a mixture of potassium ferrocyanide and potassium ferricyanide.

As illustrated in the examples that follow, the oxidizing species may be in complexed or non-complexed form, in ionic form or else in the form of an oxo anion.

As an example of oxidizing species in complexed form, mention may be made of ferricyanide ($Fe(CN)_6^{3-}$), for example used in the form of a ferricyanide salt as described above, for example potassium ferricyanide.

As examples of oxidizing species in ionic form, mention may be made of iron(III) salts, for example iron(III) chloride.

The term oxo anion is intended to denote an anion containing an oxide, of the formula $QO_x^{n-}$ with Q representing a metal or nonmetal, for example iodine or manganese; n being an integer greater than or equal to 1 and x being equal to (n+w)/2 with w being the valence of the metal or nonmetal under consideration.

As examples of oxidizing species in the form of an oxo anion, mention may be made of periodate ($IO_4^-$), permanganate ($MnO_4^-$).

The oxo anions are more particularly used in the electrolyte in the form of salts, especially chosen from alkali metal or alkaline earth metal salts, in particular alkali metal salts, such as potassium salts or sodium salts. By way of example, mention may be made of sodium periodate, potassium permanganate.

According to a particular embodiment, the electrolyte for the first step of the activation treatment according to the invention employs at least one oxidizing species chosen from:

ferricyanide ($Fe(CN)_6^{3-}$), belonging to the redox pair $Fe(CN)_6^{3-}/Fe(CN)_6^{4-}$; in particular introduced in the electrolyte in the form of a ferricyanide salt, especially an alkali metal or alkaline earth metal ferricyanide, for example potassium ferricyanide;

the iron(III) ion, belonging to the redox pair $Fe^{3+}/Fe^{2+}$; in particular introduced in the electrolyte in the form of iron(III) chloride;

periodate ($IO_4^-$), belonging to the redox pair $IO_4^-/IO_3^-$, in particular introduced in the electrolyte in the form of an alkali metal or alkaline earth metal salt, for example sodium periodate;

permanganate ($MnO_4^-$), belonging to the redox pair ($MnO_4/MnO_4^{2-}$), in particular introduced in the electrolyte in the form of an alkali metal or alkaline earth metal salt, for example potassium permanganate;

and mixtures thereof.

Preferentially, the oxidizing species, in particular as defined above, is the predominant species of the redox pair in solution in the electrolyte.

Advantageously, the oxidizing species is not generated in situ at the electrolyte. Thus, preferably, the oxidizing species is present in the starting aqueous electrolyte, before initiation of the activation step, in other words before the application, to the electrode, of the alternating cathodic and anodic electrical pulses.

Advantageously, the reduced form of the oxidizing species (in other words, the reducing species of the redox pair to which the oxidizing species belongs), used in the electrolyte according to the invention, has a good stability in the aqueous medium of the electrolyte, and in particular does not precipitate from the electrolyte during the activation treatment.

Said oxidizing species may be present in the electrolyte in a content of between 0.01 and 100 mmol·$L^{-1}$, in particular between 0.1 and 20 mmol·$L^{-1}$ and more particularly between 1 and 10 mmol·$L^{-1}$, for example 1 mmol·$L^{-1}$.

According to a particular embodiment, the electrolyte for implementing the first activation step according to the invention is an aqueous medium comprising 1 mM ferricyanide, in particular in the form of potassium ferricyanide.

According to another particular embodiment, the electrolyte for implementing the first activation step according to the invention is an aqueous medium comprising 1 mM iron(III) chloride.

According to another particular embodiment, the electrolyte for implementing the first activation step according to the invention is an aqueous medium comprising 1 mM periodate, in particular in the form of sodium periodate.

According to another particular embodiment, the electrolyte for implementing the first activation step according to the invention is an aqueous medium comprising 1 mM permanganate, in particular in the form of potassium permanganate.

Said electrolyte may comprise, conventionally, an ionic salt, referred to as base salt, in addition to said oxidizing species. This base salt is used to provide the electrolyte medium with satisfactory ionic conductivity.

The base salt may especially be KCl, LiCl, NaCl. In particular, it is KCl.

The content of base salt(s) may be between 10 mmol·$L^{-1}$ (also denoted mM) and 500 mmol·$L^{-1}$, in particular between 50 mmol·$L^{-1}$ and 200 mmol·$L^{-1}$, for example may be around 100 mmol·$L^{-1}$.

As indicated above, the electrical excitation for carrying out the first electrochemical activation step according to the process of the invention is carried out in the form of an alternation of cathodic and anodic pulses, these being voltage (potential) or current pulses.

The alternation of cathodic and anodic pulses in accordance with said first electrochemical activation step may have one or other of the features described above.

Preferably, it is a periodic alternation of cathodic and anodic pulses; in particular, the electrical excitation is formed of the periodic alternation of a cathodic pulse and an anodic pulse.

According to a first embodiment variant, the first activation step according to the invention is carried out by electrical voltage (potential) pulses.

In particular, the first activation step according to the invention may be carried out by periodic alternation of cathodic and anodic voltage pulses, in particular by periodic alternation of a cathodic voltage pulse and an anodic voltage pulse (in other words, following the repetition of the sequence: 1 cathodic voltage pulse-1 anodic voltage pulse, etc.).

According to a particular embodiment, the amplitude, in absolute value, of the cathodic and anodic voltage pulses may be between 0.5 and 1.5 V, in particular between 0.6 and 1.5 V and more particularly between 0.8 and 1.3 V.

According to another embodiment variant, the first activation step according to the invention is carried out by electrical current pulses.

In particular, the first activation step according to the invention may be carried out by periodic alternation of cathodic and anodic current pulses, in particular by periodic alternation of a cathodic current pulse and an anodic current pulse.

According to a particular embodiment, the amplitude, in absolute value, of the cathodic and anodic current pulses may be between 0.1 and 100 μA·$cm^{-2}$, in particular between 0.2 and 50 μA·$cm^{-2}$ and more particularly between 0.5 and 25 μA·$cm^2$.

Preferably, all of the cathodic and anodic (voltage or current) pulses have the same amplitude, in absolute value. The amplitude of the pulses may especially be adjusted with regard to the concentration of the oxidizing species present in the electrolyte.

Preferably, the potential excitation is carried out with a pulse amplitude ranging from −1.5 V to +1.5 V, in particular from −1.2 V to +1.2 V and more particularly from −0.8 V to +0.8 V.

Preferably, the current excitation is carried out with a pulse amplitude ranging from −100 μA·$cm^{-2}$ to +100 μA·$cm^{-2}$, in particular from −50 μA·$cm^{-2}$ to +50 μA·$cm^{-2}$ and more particularly from −25 μA·$cm^{-2}$ to +25 μA·$cm^2$.

According to a particular embodiment, the duration of the cathodic and anodic pulses is between 5 and 500 ms, in particular between 10 and 250 ms and more particularly between 100 ms and 200 ms, and preferably is 100 ms. Preferably, all of the cathodic and anodic pulses have the same duration.

The duration of said first step of the activation treatment according to the invention depends especially on the parameters selected for the pulses, in particular the amplitude of the pulses applied and their nature (voltage or current pulses).

Preferably, the first electrochemical activation step according to the invention is carried out for a duration sufficient to obtain the desired electrochemical properties, in particular to obtain the desired electrochemical reactivity. In fact, without wishing to be bound by theory, beyond a certain duration of the electrical excitation treatment according to step (i), no further improvement is observed in the electrochemical reactivity of the DLC electrode; in other words, the electrochemical reactivity of the DLC electrode no longer changes.

The duration of said first electrochemical activation step according to the invention, carried out with voltage pulses, may more particularly be at least 30 minutes, in particular at least 40 minutes, more particularly at least 50 minutes and advantageously between 60 and 70 minutes.

The duration of said first electrochemical activation step according to the invention, carried out with current pulses, may more particularly be at least 80 minutes, in particular at least 100 minutes, especially at least 120 minutes and more particularly 150 minutes.

Preferably, the first step of the activation treatment according to the invention may be carried out at a temperature of between 15 and 30° C., advantageously at ambient temperature (23° C.).

According to a particularly preferred embodiment, said first step of the electrochemical activation treatment according to the invention is carried out by application, to said DLC electrode, in an aqueous electrolyte comprising 1 mM of an oxidizing species as defined above, of an electrical excitation formed of the periodic alternation of a cathodic pulse and an anodic pulse, these being voltage pulses, said cathodic and anodic pulses having a duration, $t_i$, of 100 ms, and an amplitude of −0.8 V and +0.8 V.

Within the context of this particular embodiment, the duration of said first activation step is at least 40 minutes, in particular at least 50 minutes, more particularly at least 60 minutes, preferably 60 minutes.

According to another particularly preferred embodiment, said first step of the electrochemical activation treatment according to the invention is carried out by application, to said DLC electrode, in an aqueous electrolyte comprising 10 mM of an oxidizing species as defined above, of an electrical excitation formed of the periodic alternation of a cathodic pulse and an anodic pulse, these being voltage pulses, said cathodic and anodic pulses having a duration, $t_i$, of 100 ms, and an amplitude of −1.2 V and +1.2 V.

Within the context of this particular embodiment, the duration of said first activation step is at least 10 minutes, in particular at least 15 minutes, more particularly between 15 and 25 minutes, preferably 20 minutes.

According to yet another particular embodiment, the first step of the electrochemical activation treatment according to the invention is carried out by application, to said DLC electrode, in an aqueous electrolyte comprising 1 mM of an oxidizing species as defined above, of an electrical excitation formed of the periodic alternation of a cathodic pulse and an anodic pulse, these being current pulses, said cathodic and anodic pulses having a duration, $t_i$, of 100 ms, and an amplitude of −20 µA and +20 µA.

Within the context of this particular embodiment, the duration of said first activation step is at least 80 minutes, in particular at least 100 minutes, especially at least 120 minutes, more particularly 150 minutes.

(ii) Second Activation Step

As indicated above, the second step (ii) of the electrochemical activation treatment according to the invention is carried out in an aqueous electrolyte which, in contrast to the electrolyte used for the first step (i) of the activation treatment, does not comprise any electroactive species.

The term "electroactive species" is intended to denote a species which is electrochemically oxidized or reduced under the electrochemical conditions employed.

The electrolyte devoid of electroactive species more particularly has an oxidizing nature, in other words comprises one or more oxidizing compounds.

Preferably, it comprises one or more oxidizing compounds chosen from perchlorates, such as $NaClO_4$, $KClO_4$, $LiClO_4$; sulfates, such as $Na_2SO_4$, $K_2SO_4$, $Li_2SO_4$; acids such as $HClO_4$, $H_3PO_4$, $H_2SO_4$, and mixtures thereof.

Preferably, the aqueous medium of the electrolyte in contact with which the second step of the activation treatment is carried out is formed by water.

According to a particular embodiment, the electrolyte used for said second activation step is sulfuric acid ($H_2SO_4$) diluted in water.

The concentration of oxidizing species, in particular the concentration of sulfuric acid, in the electrolyte used to carry out said second activation step, may especially be between 0.05 and 1.0 mol·L$^{-1}$, in particular between 0.1 and 1.0 mol·L$^{-1}$.

As indicated above, the electrical excitation for carrying out said second electrochemical activation step according to the process of the invention is carried out in the form of an alternation of cathodic and anodic pulses, these being voltage (potential) pulses.

In particular, as illustrated in the examples that follow, the inventors have shown that an application, for this second step, of the excitation in the form of current pulses does not make it possible to obtain the sought improvement in electrochemical properties of the DLC electrode.

The alternation of cathodic and anodic voltage pulses in accordance with said second electrochemical activation step may have one or other of the features described above.

Preferably, said second activation step according to the invention may be carried out by alternation of cathodic and anodic voltage pulses, in particular by alternation of a single cathodic voltage pulse and a single anodic voltage pulse (in other words, following the repetition of the sequence: 1 cathodic voltage pulse-1 anodic voltage pulse, etc.).

According to a particular embodiment, the amplitude, in absolute value, of the cathodic and anodic voltage pulses may be between 0.8 and 1.9 V, in particular between 1.0 and 1.8 V and more particularly between 1.2 and 1.5 V.

Preferably, all of the cathodic and anodic voltage pulses have the same amplitude, in absolute value. Preferably, the excitation is carried out with a pulse amplitude ranging from −1.9 V to +1.9 V, in particular from −1.5 V to +1.5 V and more particularly from −1.3 V to +1.3 V.

According to a particular embodiment, the duration of the cathodic and anodic pulses is between 5 and 500, in particular between 10 and 250 and more particularly between 100 ms and 200 ms, and preferably is 100 ms. Preferably, all of the cathodic and anodic pulses have the same duration.

The duration of said second step of the activation treatment may more particularly be adjusted with regard to the parameters selected for the pulses, in particular the amplitude of the pulses applied.

Preferably, the second electrochemical activation step according to the invention is carried out for a duration sufficient to obtain the desired electrochemical properties, in particular to obtain the desired electrochemical reactivity. In fact, without wishing to be bound by theory, beyond a certain duration of the electrical excitation treatment according to step (ii), no further improvement is observed in the electrochemical reactivity of the DLC electrode; in other words, the electrochemical reactivity of the DLC electrode no longer changes.

The duration of said second electrochemical activation step according to the invention may more particularly be at least 15 minutes, in particular at least 20 minutes, more particularly between 20 and 30 minutes, especially 20 minutes.

Preferably, said second step of the activation treatment according to the invention may be carried out at a temperature of between 15 and 30° C., advantageously at ambient temperature (23° C.).

According to a particularly preferred embodiment, said second step of the electrochemical activation treatment according to the invention is carried out by application, to said DLC electrode that was previously subjected to said first activation step, in contact with an aqueous electrolyte comprising 0.5 M sulfuric acid, of an electrical excitation formed of the periodic alternation of a cathodic pulse and an anodic pulse, these being voltage pulses, said cathodic and anodic pulses having a duration, $t_i$, of 100 ms, and an amplitude of –1.3 V and +1.3 V.

Within the context of this particular embodiment, the duration of said second activation step may be more particularly at least 15 minutes, in particular at least 20 minutes, preferably 20 minutes.

It is understood that all of the features indicated above for said first and second steps of the electrochemical activation treatment according to the invention may be combined to define particular embodiments of the activation process according to the invention.

Device for the Electrochemical Activation

It is up to those skilled in the art to implement an electrochemical device that is appropriate for performing the electrochemical activation treatment according to the invention.

In general, the device for performing the activation process according to the invention is a three-electrode assembly, in other words an electrochemical cell equipped with a working electrode based on DLC amorphous carbon, a reference electrode and a counter electrode. The working electrode consists of the DLC electrode that is to be activated. As indicated above, this may for example be a silicon wafer supporting a DLC layer, or else an individual DLC-based electrode.

Any reference electrode can be used. This may for example be an Ag/AgCl reference electrode, or else an electrode of SCE (saturated calomel electrode) type, or else a DLC pseudo-reference electrode.

The counter electrode can consist of any conductive material, in particular can be made of platinum. Alternatively, it may also be a DLC electrode.

The electrical excitation in the form of alternating cathodic and anodic pulses may be generated by a suitable potentiostat.

Application

As mentioned above, the activation process according to the invention makes it possible to obtain DLC-based electrodes having excellent electrochemical properties, in particular a high electrochemical reactivity and active surface area, good reproducibility, homogeneity and stability of these electrochemical performance qualities.

The activated DLC-based electrodes obtained on conclusion of the activation process according to the invention, optionally followed by a step of cutting to obtain the desired dimensions, may advantageously be used in electrochemical sensors or devices for the physicochemical analysis of liquids, for example for the detection of contaminating elements, especially for applications in monitoring the quality of water or of other effluents (analysis directly in the water flow, followed by pollution removal processes in purification stations, etc.).

They may also be used as electrodes in biotechnological detectors, for example for monitoring a bio-production process.

Of course, the invention is not limited to the applications described above, and other applications of the activated DLC electrodes according to the invention may be envisaged.

The invention will now be described by means of the examples and figures that follow, which are given of course by way of illustration and do not limit the invention.

EXAMPLE

The following tests were carried out with the aid of an electrochemical cell equipped with the following three electrodes:

a working electrode: DLC electrode with a surface area of 21 mm², formed of a 50 nm-thick DLC layer deposited on a silicon wafer.

The DLC is deposited beforehand by magnetron cathode sputtering at a temperature of 25° C. with a power of 1 kW in the presence of argon as carrier gas, onto a silicon support that has been chemically deoxidized on the front and rear faces in order to improve the transverse electrical conductivity.

a reference electrode: DLC electrode of the same nature as the working electrode; and a counter electrode: DLC electrode of the same nature as the working electrode.

The conditions of the electrochemical treatment in one or more steps of electrical excitation are detailed for each of the tests carried out in the examples that follow. The treatments are carried out at ambient temperature (23° C.).

The pulses are applied on the working electrode using the Modulo Bat (MB) technique.

The electrical excitation in the form of pulses is generated by a potentiostat (reference used: Biologic VPM300).

Evaluation of the Electrochemical Performance Qualities

The variation in the electrochemical properties (electrochemical reactivity and active surface area) of the electrodes in the following examples is evaluated by cyclic voltammetry (VC), in the presence of an equimolar mixture of 1 mM potassium ferri/ferrocyanide diluted in 0.1 M KCl.

The electrochemical reactivity of an electrode is considered to be all the better the smaller the difference, $\Delta E_p$, between the potential of the anodic peak and that of the cathodic peak. The influence of the electrochemical treatment on the active surface area of the electrode can be assessed by the variation in the intensity of the anodic and/or cathodic current. The greater the intensity of the anodic and/or cathodic current, in absolute value, the greater the number of active sites on the DLC electrode.

Example 1

Electrochemical Activation of the Electrode According to a Process in Accordance with the Invention 1.1. Activation According to the Process of the Invention The conditions of the electrochemical activation treatment are as follows:

$1^{st}$ step: electrochemical treatment in an aqueous electrolyte comprising 1 mM of an equimolar potassium ferri/ferrocyanide mixture and 100 mM KCl;

Alternating voltage pulses following the sequence 1 cathodic pulse-1 anodic pulse: duration of a cathodic/anodic pulse: 0.1 seconds; amplitude of the pulses: +0.8 V for an anodic pulse; –0.8 V for a cathodic pulse.

Total duration of excitation: 60 minutes $2^{nd}$ step: electrochemical treatment in an aqueous electrolyte comprising 0.5 M sulfuric acid Alternating voltage pulses following the sequence 1 cathodic pulse-1 anodic pulse: duration of a cathodic/ anodic pulse: 0.1 seconds; amplitude of the pulses: +1.3 V for an anodic pulse; −1.3 V for a cathodic pulse.

Total duration of excitation: 20 minutes.

Evaluation of the Electrochemical Performance Qualities

The surface of the DLC electrode is characterized by cyclic voltammetry (VC) before activation, after the $1^{st}$ step of the activation treatment and after the $2^{nd}$ step of the activation treatment (FIG. 1).

The electrochemical values obtained after activation and after each of the two steps of the activation treatment according to the invention are collated in the following table.

TABLE 1

| Step | $E_a$ (mV) | $E_c$ (mV) | $i_a$ (µA) | $i_c$ (µA) | $\Delta E_p$ (mV) |
|---|---|---|---|---|---|
| Before activation | 200 | −215 | 37 | −37 | 415 |
| After the $1^{st}$ step | 58 | −75 | 58 | −57 | 133 |
| After the $2^{nd}$ step | 28 | −42 | 64 | −66 | 70 |

The results show that the consecutive application of the two steps of the activation treatment according to the invention makes it possible to significantly reduce the $\Delta E_p$ value since this is reduced from an initial value before activation of 415 mV to 70 mV on conclusion of the two steps of the activation treatment.

It can also be noted that the intensity of the anodic and cathodic currents increases, in absolute value, from 37 µA to 64/66 µA after the two activation steps.

1.2. Variations in the Activation Durations

The electrochemical activation treatment as described in abovementioned point 1.1 is reproduced while varying the duration of the first step of the electrochemical treatment up to 90 minutes, and the duration of the second step of the electrochemical treatment (at the end of an excitation duration according to the first step of 90 minutes) up to 50 minutes.

Evaluation of the Electrochemical Performance Qualities

The results of FIG. 2 show that optimal reactivity is achieved for a first activation treatment step carried out under the abovementioned conditions for a duration of 60 minutes, followed by a second activation treatment step carried out under the abovementioned conditions for 20 minutes.

1.3. Reproducibility of the Activation Process

The reproducibility of the activation process according to the invention is verified.

Three separate DLC electrodes were subjected to the two successive steps of the activation treatment under the conditions described in Example 1.1.

Evaluation of the Electrochemical Performance Qualities

The electrochemical performance qualities, $\Delta E_p$ and $i_{max}$, obtained for the three electrodes, before the first step of the activation treatment, after the first step of the electrochemical treatment and on conclusion of the second step of the electrochemical treatment, are presented in the following table.

TABLE 2

| Electrochemical performance qualities | | Electrode 1 | Electrode 2 | Electrode 3 |
|---|---|---|---|---|
| $\Delta E_p$ (mV) | Before activation | 415 | 520 | 430 |
| | After the $1^{st}$ step | 133 | 126 | 130 |
| | After the $2^{nd}$ step | 70 | 72 | 70 |

TABLE 2-continued

| Electrochemical performance qualities | | Electrode 1 | Electrode 2 | Electrode 3 |
|---|---|---|---|---|
| $I_{max}$ (µA) | Before activation | 37 | 35 | 34.6 |
| | After the $1^{st}$ step | 57.5 | 57 | 56 |
| | After the $2^{nd}$ step | 65 | 66 | 64 |

These results show that the surface activation process according to the invention is, on the one hand, reproducible.

On the other hand, the activation process according to the invention makes it possible not only to improve the electrochemical reactivity and increase the number of active sites, but also to homogenize these parameters. Thus, irrespective of the values for $\Delta E_p$ and $i_{max}$ of the DLC electrodes before activation, the electrodes have similar and significantly increased values for $\Delta E_p$ and $i_{max}$ on conclusion of the two steps of the activation treatment according to the invention.

1.4. Stability of the Activated Electrodes

The performance qualities of the DLC electrode activated according to the two-step activation process according to the invention, carried out under the conditions described in Example 1.1., are evaluated after several days of exposing the activated electrode to the open air.

The results for the electrochemical properties, $\Delta E_p$ and $i_{max}$, of the DLC electrode just after activation, and then after one day, 2 days and 10 days of exposure to the open air, are presented in the following table.

TABLE 3

| Time | $E_a$ (mV) | $E_c$ (mV) | $i_a$ (µA) | $i_c$ (µA) | $\Delta E_p$ |
|---|---|---|---|---|---|
| After activation | 28 | −42 | 64 | −66 | 70 |
| After 1 day | 30 | −42 | 62 | −63 | 72 |
| After 2 days | 35 | −48 | 59 | −62 | 83 |
| After 10 days | 38 | 50 | 59 | −62 | 88 |

These results show that the DLC electrode activated according to the invention has a good stability to oxidation over time. The exposure of the DLC electrode to the open air results in a small decrease in the reactivity of the electrode and in the number of active sites. This behaviour may be due to the oxidation of the terminal hydrogens or to the fouling of the surface of the electrode by contaminating substances, but remains limited and very acceptable.

Example 2

Study of the Effect of the Duration of the Pulses

A DLC electrode was subjected to the first step of the electrochemical activation treatment according to the invention, described in Example 1.1. above, except for the fact that the duration of the alternating cathodic and anodic pulses was increased to 0.2 seconds.

Evaluation of the Electrochemical Performance Qualities

FIG. 3 represents the results for the electrochemical reactivity of the electrode ($\Delta E_p$) on conclusion of the first step of the activation treatment for different electrical excitation durations.

The DLC electrode has a value for $\Delta E_p$, after 70 minutes of excitation with alternating 0.2 ms pulses, of 165 mV, whereas an excitation with alternating 0.1 ms pulses made it possible to achieve a value for $\Delta E_p$, after 70 minutes of excitation, of 130 mV (Example 1.2).

It can be noted that the duration of this first treatment step carried out with pulses of 0.2 seconds, necessary to achieve an electrochemical reactivity similar to that achieved with a pulse time of 0.1 seconds, is longer, with a final value for $\Delta E_p$ which remains greater than the value achieved with pulses of 0.1 seconds.

Example 3

First Step of the Activation Treatment in the 10 mM Ferri/Ferrocyanide Electrolyte with a Pulse Amplitude of 1.2 V A DLC electrode was subjected to the first step of the activation treatment described in Example 1.1. above, except for the fact that the concentration of the oxidizing species (ferricyanide) in the electrolyte was increased to 10 mM and the amplitude of the potential pulses, in absolute value, was increased to 1.2 V.

The conditions of this first activation step are therefore as follows.

$1^{st}$ step of the activation treatment in an aqueous electrolyte comprising 10 mM of an equimolar ferri/ferrocyanide mixture and 100 mM KCl Alternating voltage pulses following the sequence 1 cathodic pulse-1 anodic pulse: duration of a cathodic/anodic pulse: 0.1 seconds; amplitude of the pulses: +1.2 V for an anodic pulse; −1.2 V for a cathodic pulse.

Total duration of excitation: up to 40 minutes.
Evaluation of the Electrochemical Performance Qualities FIG. 4 presents the results for the electrochemical reactivity of the electrode ($\Delta E_p$) on conclusion of the first step of the activation treatment for different excitation durations.

The results of FIG. 4 show that the electrochemical reactivity ($\Delta E_p$) that can be achieved under the conditions of the first step of the electrochemical treatment described above (concentration of oxidizing species of 10 mM and pulse amplitude of 1.2 V) is slightly lower than that which can be achieved under the conditions of Example 1 (concentration of oxidizing species of 1 mM and pulse amplitude of 0.8 V): final $\Delta E_p$ of 180 mV versus 130 mV for Example 1.

Nevertheless, it should be noted that the duration of the excitation treatment is shortened compared to Example 1.

Example 4

Activation According to the Process of the Invention with a First Step of Excitation by Current Pulses A DLC electrode was subjected to the first step of the activation treatment described in Example 1.1. above, except for the fact that the excitation was carried out by current pulses and not voltage pulses.

The conditions of this first activation step are therefore as follows:

$1^{st}$ step of the activation treatment in an aqueous electrolyte comprising 10 mM of an equimolar ferri/ferrocyanide mixture and 100 mM KCl Alternating current pulses following the sequence 1 cathodic pulse-1 anodic pulse: duration of a cathodic/anodic pulse: 0.1 seconds; amplitude of the pulses: +20 µA for an anodic pulse (corresponding to a current density of −1 µA·cm$^{-2}$); −20 µA for a cathodic pulse (corresponding to a current density of +1 µA·cm$^{-2}$).

Total duration of excitation: up to 200 minutes.

Evaluation of the Electrochemical Performance Qualities

FIG. 5 presents the variation in $\Delta E_p$ on conclusion of the first step of the activation treatment, carried out with potential pulses (Example 1) or current pulses, as a function of the excitation duration.

It is possible to obtain similar performance qualities in terms of electrochemical reactivity with an excitation by current pulses, with a treatment time of 2 hours and 30 minutes, and therefore longer compared to the treatment carried out with potential pulses (Example 1).

Example 5

Second Step of Excitation with Current Pulses (Outside of the Invention)

The DLC electrode, on conclusion of the first step of excitation with current pulses as described in abovementioned Example 4, of a duration of 2 hours and 30 minutes, was subjected to a second electrochemical treatment step carried out by excitation by current pulses and not potential pulses.

The conditions of the second step of the electrochemical treatment are as follows:

$2^{nd}$ step: electrochemical treatment in an aqueous electrolyte comprising 0.5 M sulfuric acid;

Alternating current pulses following the sequence 1 cathodic pulse-1 anodic pulse: duration of a cathodic/anodic pulse: 0.1 seconds; amplitude of the pulses: +20 µA (corresponding to a current density of +1 µA·cm$^{-2}$) for an anodic pulse; −20 µA (corresponding to a current density of −1 µA·cm$^{-2}$) for a cathodic pulse.

Total duration of excitation: 40 minutes and 80 minutes.
Evaluation of the Electrochemical Performance Qualities FIG. 6 presents the voltammograms produced for the DLC electrode before activation, on conclusion of the first step of the electrochemical treatment (carried out in accordance with the conditions of Example 4) and on conclusion of the second step of the electrochemical treatment carried out with current pulses.

It can be observed that the value of $\Delta E_p$ varies in a negative and insignificant manner after the second treatment step carried out with current pulses.

Example 6

First Step of Excitation with Cathodic Potential Pulses (Outside of the Invention)

A DLC electrode was subjected to a first electrochemical treatment step as described in Example 1.1. above, except for the fact that the excitation was carried out solely with cathodic potential pulses (and hence not with alternating pulses).

The conditions of this electrochemical treatment are as follows:

Aqueous electrolyte comprising 1 mM of an equimolar potassium ferri/ferrocyanide mixture and 100 mM KCl;

Cathodic potential pulses: duration of a cathodic pulse: 0.1 seconds; amplitude of the cathodic pulses: −0.8 V.

Total duration of excitation: 10 and 20 minutes
Evaluation of the Electrochemical Performance Qualities FIG. 7 presents the voltammograms produced for the DLC electrode before activation, and after 10 minutes and 20 minutes of the first step of electrochemical treatment by cathodic pulses.

It can be observed that the treatment of the DLC electrode by excitation solely with cathodic potential pulses has no effect on the electrochemical characteristics of the electrode, compared to a treatment carried out in accordance with the process of the invention with alternating pulses (Example 1).

Example 7

First Step of Excitation with Anodic Potential
Pulses (Outside of the Invention)

A DLC electrode was subjected to the first step of the activation treatment described in Example 1.1. above, except for the fact that the excitation was carried out solely with anodic potential pulses (and hence not with alternating pulses).

The conditions of this electrochemical treatment are as follows:

Aqueous electrolyte comprising 1 mM of an equimolar ferri/ferrocyanide mixture and 100 mM KCl;

Anodic potential pulses: duration of an anodic pulse: 0.1 seconds; amplitude of the anodic pulses: +0.8 V.

Total duration of excitation: 10 minutes and 20 minutes

Evaluation of the Electrochemical Performance Qualities

FIG. 8 presents the voltammograms produced for the DLC electrode before activation, and after 10 minutes and 20 minutes of the first step of electrochemical treatment by anodic pulses.

It can be observed that the treatment of the DLC electrode by excitation solely with anodic potential pulses has no effect on the electrochemical characteristics of the electrode, compared to a treatment carried out in accordance with the process of the invention with alternating pulses (Example 1).

Example 8

First Step of Excitation in an Electrolyte in the
Absence of Oxidizing Species (Outside of the
Invention)

A DLC electrode was subjected to the first step of the activation treatment described in Example 1.1. above, except for the fact that the excitation was carried out in an electrolyte devoid of oxidizing species according to the invention.

The conditions of this electrochemical treatment are as follows:

Aqueous electrolyte comprising 100 mM KCl;

Alternating voltage pulses following the sequence 1 cathodic pulse-1 anodic pulse: duration of a cathodic/anodic pulse: 0.1 seconds; amplitude of the pulses: +0.8 V for an anodic pulse; −0.8 V for a cathodic pulse.

Total duration of excitation: up to 60 minutes

Evaluation of the Electrochemical Performance Qualities

FIG. 9 represents the results for the electrochemical reactivity of the electrode ($\Delta E_p$) on conclusion of the electrochemical treatment carried out in the electrolyte in the absence of oxidizing species for different electrical excitation durations.

It can be observed that the treatment of the DLC electrode in an electrolyte comprising solely KCl, in the absence of oxidizing species, results in a very small improvement in the electrochemical reactivity ($\Delta E_p$ of 325 mV after 40 minutes). The second activation step was consequently not carried out.

Example 9

First Step of Excitation in an Electrolyte
Comprising Mohr's Salt (Outside of the Invention)

A DLC electrode was subjected to the first step of the activation treatment described in Example 1.1. above, except for the fact that the excitation was carried out in an electrolyte comprising 1 mM Mohr's salt (ammonium iron (II) sulfate hexahydrate $(NH_4)_2Fe(SO_4)_2 \cdot 6H_2O$) in 0.1 M KCl.

The conditions of this electrochemical treatment are as follows:

Aqueous electrolyte comprising 1 mM Mohr's salt and 0.1 M KCl

Alternating voltage pulses following the sequence 1 cathodic pulse-1 anodic pulse: duration of a cathodic/anodic pulse: 0.1 seconds; amplitude of the pulses: +0.8 V for an anodic pulse; −0.8 V for a cathodic pulse.

Total duration of excitation: 10 and 20 minutes.

Evaluation of the Electrochemical Performance Qualities

FIG. 10 presents the voltammograms produced for the DLC electrode before electrochemical treatment, and after 10 minutes and 20 minutes of the electrochemical treatment in the electrolyte comprising Mohr's salt.

It can be observed that the treatment of the DLC electrode in the electrolyte comprising Mohr's salt has no effect on the electrochemical characteristics of the electrode, compared to a treatment carried out in accordance with the process of the invention in an electrolyte comprising the oxidizing species ferricyanide (Example 1).

Example 10

First Step of Excitation in an Electrolyte
Comprising Cobaltocene (Outside of the Invention)

A DLC electrode was subjected to the first step of the activation treatment described in Example 1.1. above, except for the fact that the excitation was carried out in an electrolyte comprising 1 mM cobaltocene ($[Co(\eta_5C_5H_5)_2]$) in 0.1 M KCl.

The conditions of this electrochemical treatment are as follows:

Aqueous electrolyte comprising 1 mM cobaltocene and 0.1 M KCl

Alternating voltage pulses following the sequence 1 cathodic pulse-1 anodic pulse: duration of a cathodic/anodic pulse: 0.1 seconds; amplitude of the pulses: +0.8 V for an anodic pulse; −0.8 V for a cathodic pulse.

Activation duration: 10 and 20 minutes.

Evaluation of the Electrochemical Performance Qualities

FIG. 11 presents the voltammograms produced for the DLC electrode before electrochemical treatment, and after 10 minutes and 20 minutes of the electrochemical treatment in the electrolyte comprising cobaltocene.

It can be observed that the treatment of the DLC electrode in the electrolyte comprising cobaltocene has no effect on the electrochemical characteristics of the electrode, compared to a treatment carried out in accordance with the process of the invention in an electrolyte comprising the oxidizing species ferricyanide (Example 1).

Example 11

First Step of Excitation in an Electrolyte Comprising Sodium Cyanide (Outside of the Invention)

A DLC electrode was subjected to the first step of the activation treatment described in Example 1.1. above, except for the fact that the excitation was carried out in an electrolyte comprising 1 mM sodium cyanide in 0.1 M KCl.

The conditions of this electrochemical treatment are as follows:

Aqueous electrolyte comprising 1 mM sodium cyanide and 0.1 M KCl

Alternating voltage pulses following the sequence 1 cathodic pulse-1 anodic pulse: duration of a cathodic/anodic pulse: 0.1 seconds; amplitude of the pulses: +0.8 V for an anodic pulse; −0.8 V for a cathodic pulse.

Total duration of excitation: 10, 20 and 30 minutes.

Evaluation of the Electrochemical Performance Qualities

FIG. 12 presents the voltammograms produced for the DLC electrode before electrochemical treatment, and after 10 minutes, 20 minutes and 30 minutes of the electrochemical treatment in the electrolyte comprising sodium cyanide.

It can be observed that the treatment of the DLC electrode in the electrolyte comprising sodium cyanide has no effect on the electrochemical characteristics of the electrode, compared to a treatment carried out in accordance with the process of the invention in an electrolyte comprising the oxidizing species ferricyanide (Example 1).

Example 12

First Step of Excitation in an Electrolyte Comprising Ferrocenemethanol (Outside of the Invention)

A DLC electrode was subjected to the first step of the activation treatment described in Example 1.1. above, except for the fact that the excitation was carried out in an electrolyte comprising 1 mM ferrocenemethanol in 0.1 M KCl.

The conditions of this electrochemical treatment are as follows:

Aqueous electrolyte comprising 1 mM ferrocenemethanol and 0.1 M KCl;

Alternating voltage pulses following the sequence 1 cathodic pulse-1 anodic pulse: duration of a cathodic/anodic pulse: 0.1 seconds; amplitude of the pulses: +0.8 V for an anodic pulse; −0.8 V for a cathodic pulse;

Activation duration: 10 and 20 minutes.

Evaluation of the Electrochemical Performance Qualities

FIG. 13 presents the voltammograms produced for the DLC electrode before electrochemical treatment, and after 10 minutes and 20 minutes of the electrochemical treatment in the electrolyte comprising ferrocenemethanol.

It can be observed that the treatment of the DLC electrode in the electrolyte comprising ferrocenemethanol has no effect on the electrochemical characteristics of the electrode, compared to a treatment carried out in accordance with the process of the invention in an electrolyte comprising the oxidizing species ferricyanide (Example 1).

Example 13

First Step of Excitation in an Electrolyte Comprising Sodium Ferrocyanide (Outside of the Invention)

A DLC electrode was subjected to the first step of the activation treatment described in Example 1.1. above, except for the fact that the excitation was carried out in electrolytes comprising, respectively, 1 mM and 2 mM sodium ferrocyanide in 0.1 M KCl.

The conditions of this electrochemical treatment are as follows:

Aqueous electrolyte comprising 1 mM or 2 mM sodium ferrocyanide and 0.1 M KCl;

Alternating voltage pulses following the sequence 1 cathodic pulse-1 anodic pulse: duration of a cathodic/anodic pulse: 0.1 seconds; amplitude of the pulses: +0.8 V for an anodic pulse; −0.8 V for a cathodic pulse;

Activation duration: 10, 20 and 30 minutes.

Evaluation of the Electrochemical Performance Qualities

FIG. 14 presents the voltammograms produced for the DLC electrode before electrochemical treatment, and after 10 minutes, 20 minutes and 30 minutes of the electrochemical treatment in the electrolyte comprising 1 mM (a) and 2 mM (b) sodium ferrocyanide.

It can be observed that the treatment of the DLC electrode in the electrolytes comprising sodium ferrocyanide has no effect on the electrochemical characteristics of the electrode, compared to a treatment carried out in accordance with the process of the invention in an electrolyte comprising the oxidizing species ferricyanide (Example 1).

Example 14

First Step of Excitation in an Electrolyte Comprising Potassium Ferrocyanide (Outside of the Invention)

A DLC electrode was subjected to the first step of the activation treatment described in Example 1.1. above, except for the fact that the excitation was carried out in an electrolyte comprising 1 mM potassium ferrocyanide in 0.1 M KCl.

The conditions of this electrochemical treatment are as follows:

Aqueous electrolyte comprising 1 mM potassium ferrocyanide and 0.1 M KCl;

Alternating voltage pulses following the sequence 1 cathodic pulse-1 anodic pulse: duration of a cathodic/anodic pulse: 0.1 seconds; amplitude of the pulses: +0.8 V for an anodic pulse; −0.8 V for a cathodic pulse;

Activation duration: 10, 20 and 30 minutes.

Evaluation of the Electrochemical Performance Qualities

FIG. 15 presents the voltammograms produced for the DLC electrode before electrochemical treatment, and after 10 minutes, 20 minutes and 30 minutes of the electrochemical treatment in the electrolyte comprising 1 mM potassium ferrocyanide.

A slight variation in the voltammetry curves can be observed, but not any positive impact of the treatment of the DLC electrode in the electrolyte comprising potassium ferrocyanide on the surface electrochemical reactivity of the electrode.

Example 15

Electrochemical Activation of the Electrode According to a Process in Accordance with the Invention with a First Step of Excitation in an Electrolyte Comprising Potassium Ferricyanide A DLC electrode was subjected to both steps of the activation treatment described in Example 1.1. above, except for the fact that the first excitation step was carried out in an electrolyte comprising 1 mM potassium ferricyanide in 0.1 M KCl.

The conditions of the electrochemical activation treatment are as follows:

$1^{st}$ step: electrochemical treatment in an aqueous electrolyte comprising 1 mM potassium ferricyanide and 100 mM KCl;

Alternating voltage pulses following the sequence 1 cathodic pulse-1 anodic pulse: duration of a cathodic/anodic pulse: 0.1 seconds; amplitude of the pulses: +0.8 V for an anodic pulse; −0.8 V for a cathodic pulse.

Total duration of excitation: 80 minutes $2^{nd}$ step: electrochemical treatment in an aqueous electrolyte comprising 0.5 M sulfuric acid Alternating voltage pulses following the sequence 1 cathodic pulse-1 anodic pulse: duration of a cathodic/anodic pulse: 0.1 seconds; amplitude of the pulses: +1.3 V for an anodic pulse; −1.3 V for a cathodic pulse.

Total duration of excitation: 30 minutes.

Evaluation of the Electrochemical Performance Qualities

FIG. 16 presents the voltammograms produced for the DLC electrode before the first step of the activation treatment, after the first step of the electrochemical treatment and on conclusion of the second step of the electrochemical treatment.

The results of FIG. 17 show that optimal reactivity is achieved for a first activation treatment step carried out under the abovementioned conditions for a duration of 40 minutes, followed by a second activation treatment step carried out under the abovementioned conditions for 20 minutes.

The results show that the electrochemical reactivity ($\Delta E_p$) that can be achieved under the conditions of the first step of the electrochemical treatment described above, in an electrolyte comprising potassium ferricyanide, is slightly lower than that which can be achieved under the conditions of Example 1, in an electrolyte comprising a potassium ferricyanide/ferrocyanide mixture: final $\Delta E_p$ of 205 mV versus 133 mV for Example 1.

Nevertheless, the performance qualities obtained on conclusion of the second step of the electrochemical treatment are similar to those obtained under the conditions of Example 1: final $\Delta E_p$ of 65 mV.

Example 16

Electrochemical Treatment in Accordance with the Second Excitation Step without a First Excitation Step (Outside of the Invention)

A DLC electrode was subjected to the second step of the activation treatment described in Example 1.1. above, without carrying out the first step of the activation treatment beforehand.

The conditions of this electrochemical treatment step are as follows:

Aqueous electrolyte comprising 0.5 M sulfuric acid

Alternating voltage pulses following the sequence 1 cathodic pulse-1 anodic pulse: duration of a cathodic/anodic pulse: 0.1 seconds; amplitude of the pulses: +1.3 V for an anodic pulse; −1.3 V for a cathodic pulse.

Total duration of excitation: 10, 20 and 30 minutes.

FIG. 18 presents the voltammograms produced for the DLC electrode before electrochemical treatment, and after 10 minutes, 20 minutes and 30 minutes of the second step of the electrochemical treatment without a prior first step.

It can be observed that the treatment of the DLC electrode directly following the second step of the activation treatment according to the invention, without carrying out a first activation step according to the invention, results in a value of $\Delta E_p$ that varies significantly and in a non-reproducible manner with the duration of the excitation treatment. Thus, the electrochemical properties are degraded after 10 minutes of treatment, and then improved after 20 minutes before dropping again after 30 minutes.

Example 17

Electrochemical Activation of the Electrode According to a Process in Accordance with the Invention with a First Step of Excitation in an Electrolyte Comprising Iron Chloride (Invention)

A DLC electrode was subjected to both steps of the activation treatment described in Example 1.1. above, except for the fact that the first excitation step was carried out in an electrolyte comprising 1 mM $FeCl_3$ in 0.1 M KCl.

The conditions of the electrochemical activation treatment are as follows:

$1^{st}$ step: electrochemical treatment in an aqueous electrolyte comprising 1 mM $FeCl_3$ and 0.1 M KCl Alternating voltage pulses following the sequence 1 cathodic pulse-1 anodic pulse: duration of a cathodic/anodic pulse: 0.1 seconds; amplitude of the pulses: +0.8 V for an anodic pulse; −0.8 V for a cathodic pulse.

Total duration of excitation: 10, 20, 30, 40, 50 and 60 minutes.

$2^{nd}$ step: electrochemical treatment in an aqueous electrolyte comprising 0.5 M sulfuric acid Alternating voltage pulses following the sequence 1 cathodic pulse-1 anodic pulse: duration of a cathodic/anodic pulse: 0.1 seconds; amplitude of the pulses: +1.3 V for an anodic pulse; −1.3 V for a cathodic pulse.

Total duration of excitation: 30 minutes.

Evaluation of the Electrochemical Performance Qualities

FIG. 19 represents the results for the electrochemical reactivity of the electrode ($\Delta E_p$) on conclusion of the first step of the activation treatment for different electrical excitation durations.

FIG. 20 presents the voltammograms produced for the DLC electrode before electrochemical treatment, after the first activation step and after the second activation step.

The electrochemical values obtained after activation and after each of the two steps of the activation treatment according to the invention are collated in the following table.

TABLE 4

| Step | $E_a$ (mV) | $E_c$ (mV) | $i_a$ (μA) | $i_c$ (μA) | $\Delta E_p$ (mV) |
|---|---|---|---|---|---|
| Before activation | 230 | −257 | 37 | −39 | 487 |
| After the 1st step of activation in FeCl$_3$ | 90 | −135 | 50 | −49 | 225 |
| After the 2nd step of activation in H$_2$SO$_4$ | 31 | −45 | 63 | −66 | 76 |

The performance qualities obtained are similar to those obtained under the conditions of Example 1.

Example 18

Electrochemical Activation of the Electrode According to a Process in Accordance with the Invention with a First Step of Excitation in an Electrolyte Comprising Sodium Periodate (Invention)

A DLC electrode was subjected to both steps of the activation treatment described in Example 1.1. above, except for the fact that the first excitation step was carried out in an electrolyte comprising 1 mM sodium periodate (NaIO$_4$) in 0.1 M KCl.

The conditions of the electrochemical activation treatment are as follows:

1st step: electrochemical treatment in an aqueous electrolyte comprising 1 mM NaIO$_4$ and 0.1 M KCl Alternating voltage pulses following the sequence 1 cathodic pulse-1 anodic pulse: duration of a cathodic/anodic pulse: 0.1 seconds; amplitude of the pulses: +0.8 V for an anodic pulse; −0.8 V for a cathodic pulse.

Total duration of excitation: 10, 20, 30, 40, 50 and 60 minutes.

2nd step: electrochemical treatment in an aqueous electrolyte comprising 0.5 M sulfuric acid Alternating voltage pulses following the sequence 1 cathodic pulse-1 anodic pulse: duration of a cathodic/anodic pulse: 0.1 seconds; amplitude of the pulses: +1.3 V for an anodic pulse; −1.3 V for a cathodic pulse.

Total duration of excitation: 30 minutes.

Evaluation of the Electrochemical Performance Qualities

FIG. 21 represents the results for the electrochemical reactivity of the electrode ($\Delta E_p$) on conclusion of the first step of the activation treatment for different electrical excitation durations.

FIG. 22 presents the voltammograms produced for the DLC electrode before electrochemical treatment, after the first activation step and after the second activation step.

The electrochemical values obtained after activation and after each of the two steps of the activation treatment according to the invention are collated in the following table.

TABLE 5

| Step | $E_a$ (mV) | $E_c$ (mV) | $i_a$ (μA) | $i_c$ (μA) | $\Delta E_p$ (mV) |
|---|---|---|---|---|---|
| Before activation | 260 | −277 | 30 | −31 | 537 |
| After the 1st step of activation in NaIO$_4$ | 90 | −125 | 45 | −44 | 215 |
| After the 2nd step of activation in H$_2$SO$_4$ | 20 | −45 | 59 | −60 | 65 |

The performance qualities obtained are similar to those obtained under the conditions of Example 1.

Example 19

Electrochemical Activation of the Electrode According to a Process in Accordance with the Invention with a First Step of Excitation in an Electrolyte Comprising Potassium Permanganate (Invention)

A DLC electrode was subjected to both steps of the activation treatment described in Example 1.1. above, except for the fact that the first excitation step was carried out in an electrolyte comprising 1 mM potassium permanganate (KMnO$_4$) in 0.1 M KCl.

The conditions of the electrochemical activation treatment are as follows:

1st step: electrochemical treatment in an aqueous electrolyte comprising 1 mM KMnO$_4$ and 0.1 M KCl Alternating voltage pulses following the sequence 1 cathodic pulse-1 anodic pulse: duration of a cathodic/anodic pulse: 0.1 seconds; amplitude of the pulses: +0.8 V for an anodic pulse; −0.8 V for a cathodic pulse.

Total duration of excitation: 10, 20, 30, 40, 50 and 60 minutes.

2nd step: electrochemical treatment in an aqueous electrolyte comprising 0.5 M sulfuric acid Alternating voltage pulses following the sequence 1 cathodic pulse-1 anodic pulse: duration of a cathodic/anodic pulse: 0.1 seconds; amplitude of the pulses: +1.3 V for an anodic pulse; −1.3 V for a cathodic pulse.

Total duration of excitation: 30 minutes.

Evaluation of the Electrochemical Performance Qualities

FIG. 23 presents the voltammograms produced for the DLC electrode before electrochemical treatment, after the first activation step and after the second activation step.

The electrochemical values obtained after activation and after each of the two steps of the activation treatment according to the invention are collated in the following table.

TABLE 6

| Step | $E_a$ (mV) | $E_c$ (mV) | $i_a$ (μA) | $i_c$ (μA) | $\Delta E_p$ (mV) |
|---|---|---|---|---|---|
| Before activation | 190 | −210 | 41 | −44 | 400 |
| After the 1st step of activation in KMnO$_4$ | 40 | −74 | 53 | −48 | 114 |
| After the 2nd step of activation in H$_2$SO$_4$ | 20 | −45 | 54 | −56 | 65 |

The performance qualities obtained are similar to those obtained under the conditions of Example 1.

REFERENCES

[1] J. Robertson et al., Materials Science and Engineering R(27), 2002, 129-281;
[2] Duran et al., Analyst, 2014, 139, 3160-3166;
[3] Salazar-Banda et al., Electrochemica Acta 51 (2006) 4612-4619.

The invention claimed is:

1. A process for activating the surface of an electrode based on DLC amorphous carbon by an electrochemical treatment comprising at least the following steps (i) and (ii), carried out in the following order:

(i) applying, to said electrode, an electrical excitation in the form of an alternation of cathodic and anodic electrical pulses, these being current or voltage pulses, in contact with an aqueous electrolyte comprising at least one oxidizing species of a redox pair having a standard potential, at ambient temperature and atmospheric pressure, denoted $E^0$, strictly greater than 0, and at least one base salt; and (ii) applying, to said electrode that was previously subjected to step (i), an electrical excitation in the form of an alternation of cathodic and anodic electrical pulses, these being voltage pulses, in contact with an aqueous electrolyte devoid of electroactive species.

2. The process according to claim 1, wherein said electrode based on DLC amorphous carbon is formed of a DLC layer supported by a substrate.

3. The process according to claim 2, wherein said electrode based on DLC amorphous carbon is prepared beforehand by deposition, on the surface of said substrate, of DLC by magnetron cathode sputtering.

4. The process according to claim 1, wherein the electrical pulses of step (i) and/or of step (ii) of electrical excitation have a duration of between 5 ms and 500 ms.

5. The process according to claim 1, wherein the electrical excitation in accordance with step (i) and/or step (ii) is carried out in the form of periodic pulses.

6. The process according to claim 5, wherein the electrical excitation in accordance with step (i) and/or step (ii) is carried out in the form of an alternation of a single cathodic pulse and a single anodic pulse.

7. The process according to claim 1, wherein said oxidizing species of the electrolyte of step (i) belongs to a redox pair having a standard potential, at ambient temperature and atmospheric pressure, $E^0$, of greater than or equal to 0.05 V.

8. The process according to claim 1, wherein said oxidizing species of the electrolyte of step (i) is metallic or non-metallic; in complexed form, in ionic form or in the form of an oxo anion.

9. The process according to claim 8, wherein said oxidizing species is chosen from:

ferricyanide $(Fe(CN)_6^{3-})$, belonging to the redox pair $Fe(CN)_6^{3-}/Fe(CN)_6^{4-}$;

the iron (III) ion, belonging to the redox pair $Fe^{3+}/Fe^{2+}$;

periodate $(IO_4^-)$, belonging to the redox pair $IO_4^-/IO_3^-$;

permanganate $(MnO_4^-)$, belonging to the redox pair $(MnO_4^-/MnO_4^{2-})$;

and mixtures thereof.

10. The process according to claim 1, wherein said oxidizing species of said electrolyte of step (i) is/are present in a content of between 0.01 and 100 mmol·$L^{-1}$.

11. The process according to claim 1, wherein step (i) is carried out by electrical voltage pulses.

12. The process according to claim 11, wherein said electrical voltage pulses have an amplitude, in absolute value, of between 0.5 and 1.5 V.

13. The process according to claim 1, wherein step (i) is carried out by electrical current pulses.

14. The process according to claim 13, wherein said electrical current pulses have an amplitude, in absolute value, of between 0.1 and 100 µA·$cm^{-2}$.

15. The process according to claim 1, wherein step (ii) is carried out in an aqueous electrolyte comprising one or more oxidizing compounds chosen from perchlorates; sulfates; acids, and mixtures thereof.

16. The process according to claim 1, wherein step (ii) is carried out by alternation of cathodic and anodic electrical voltage pulses of an amplitude, in absolute value, of between 0.8 and 1.9 V.

* * * * *